US012320963B2

(12) United States Patent
Hatada

(10) Patent No.: US 12,320,963 B2
(45) Date of Patent: Jun. 3, 2025

(54) ZOOM LENS AND IMAGING APPARATUS INCLUDING THE SAME

(71) Applicant: CANON KABUSHIKI KAISHA, Tokyo (JP)

(72) Inventor: Takahiro Hatada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 17/535,432

(22) Filed: Nov. 24, 2021

(65) Prior Publication Data

US 2022/0171174 A1    Jun. 2, 2022

(30) Foreign Application Priority Data

Dec. 1, 2020    (JP) .............................. 2020-199535

(51) Int. Cl.
     *G02B 15/14*      (2006.01)
     *G02B 27/64*      (2006.01)

(52) U.S. Cl.
     CPC ....... *G02B 15/1465* (2019.08); *G02B 27/646* (2013.01)

(58) Field of Classification Search
     CPC .............. G02B 15/1465; G02B 27/646; G02B 15/145519; G02B 15/14; G02B 27/64; G02B 15/145523; G02B 15/145501; G02B 15/145503; G02B 15/145505; G02B 15/145507; G02B 15/145509; G02B 15/145511; G02B 15/145513; G02B 15/145515; G02B 15/145517; G02B 15/145521; G02B 15/145525; G02B 15/145527; G02B 15/145529; G02B 15/145531; G02B 15/146; G02B 13/009;

(Continued)

(56) References Cited

U.S. PATENT DOCUMENTS 9,348,125 B2 *   5/2016   Imaoka ................. G02B 15/22
2007/0229971 A1   10/2007   Souma
(Continued)

FOREIGN PATENT DOCUMENTS

CN    102955229 A    3/2013
CN    111751965 A    10/2020
(Continued)

OTHER PUBLICATIONS

English translation of JP-WO2016121926-A1 (Aug. 2016).*

*Primary Examiner* — Thomas K Pham
*Assistant Examiner* — Kuei-Jen L Edenfield
(74) *Attorney, Agent, or Firm* — Canon U.S.A., Inc. IP Division

(57) ABSTRACT

A zoom lens L0 includes a first lens group L1 and a rear group LR disposed in order from an object side to an image side, the first lens group L1 having a negative refractive power and the rear group LR having a positive refractive power as a whole. The rear group LR includes a partial group LP, a partial group LN, and two or more lens groups between which distances change in zooming. When image blur is corrected, the partial group LN moves in a direction including a component of a direction perpendicular to an optical axis. A lens surface closest to the object side among lens surfaces of the partial group LN and a lens surface closest to the image side among the lens surfaces of the partial group LN are both concave surfaces.

29 Claims, 13 Drawing Sheets

(58) Field of Classification Search
CPC .... G02B 15/173; G02B 15/177; G02B 15/20; G02B 15/22; G02B 15/1451; G03B 5/00
USPC ....... 359/676, 680–684, 686, 678, 823, 705, 359/739
See application file for complete search history.

(56) References Cited

U.S. PATENT DOCUMENTS

| | | | |
|---|---|---|---|
| 2012/0229902 A1* | 9/2012 | Matsumura | G02B 27/646 359/557 |
| 2017/0075095 A1* | 3/2017 | Kimura | G02B 15/177 |
| 2020/0333621 A1* | 10/2020 | Harada | G02B 15/145523 |
| 2021/0124157 A1* | 4/2021 | Kawamura | G02B 15/145523 |
| 2022/0291488 A1* | 9/2022 | Yamamoto | G02B 15/1425 |

FOREIGN PATENT DOCUMENTS

| | | | |
|---|---|---|---|
| CN | 111796406 A | | 10/2020 |
| JP | 2016009113 A | | 1/2016 |
| JP | WO2016121926 A1 | * | 8/2016 |
| JP | 2017122746 A | | 7/2017 |
| JP | 2020034946 A | | 3/2020 |
| WO | 2016121945 A1 | | 8/2016 |
| WO | 2018012624 A1 | | 1/2018 |

* cited by examiner

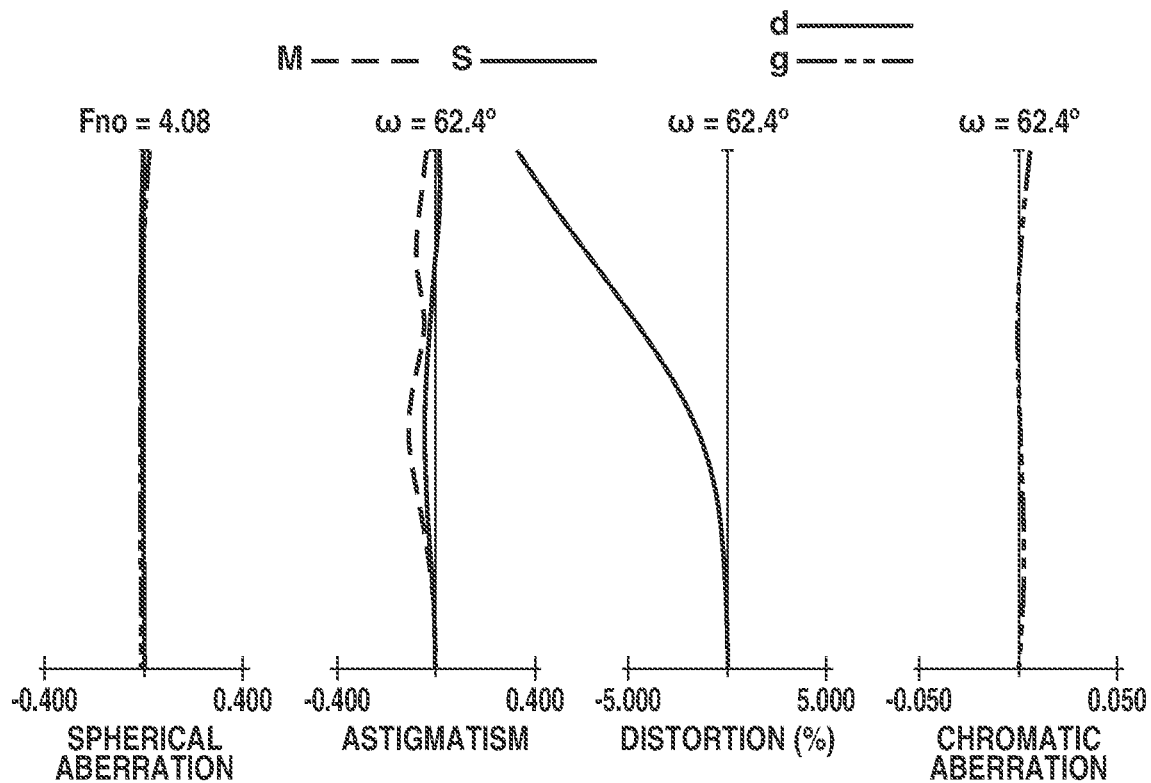
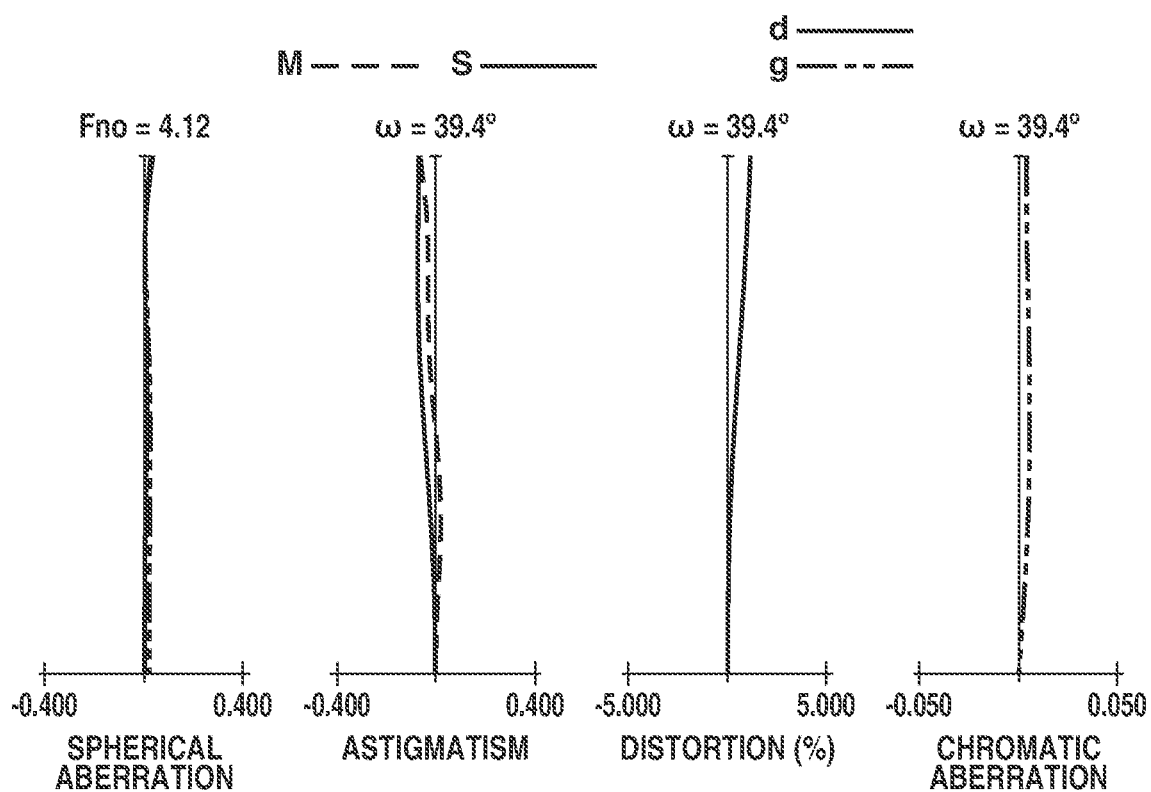

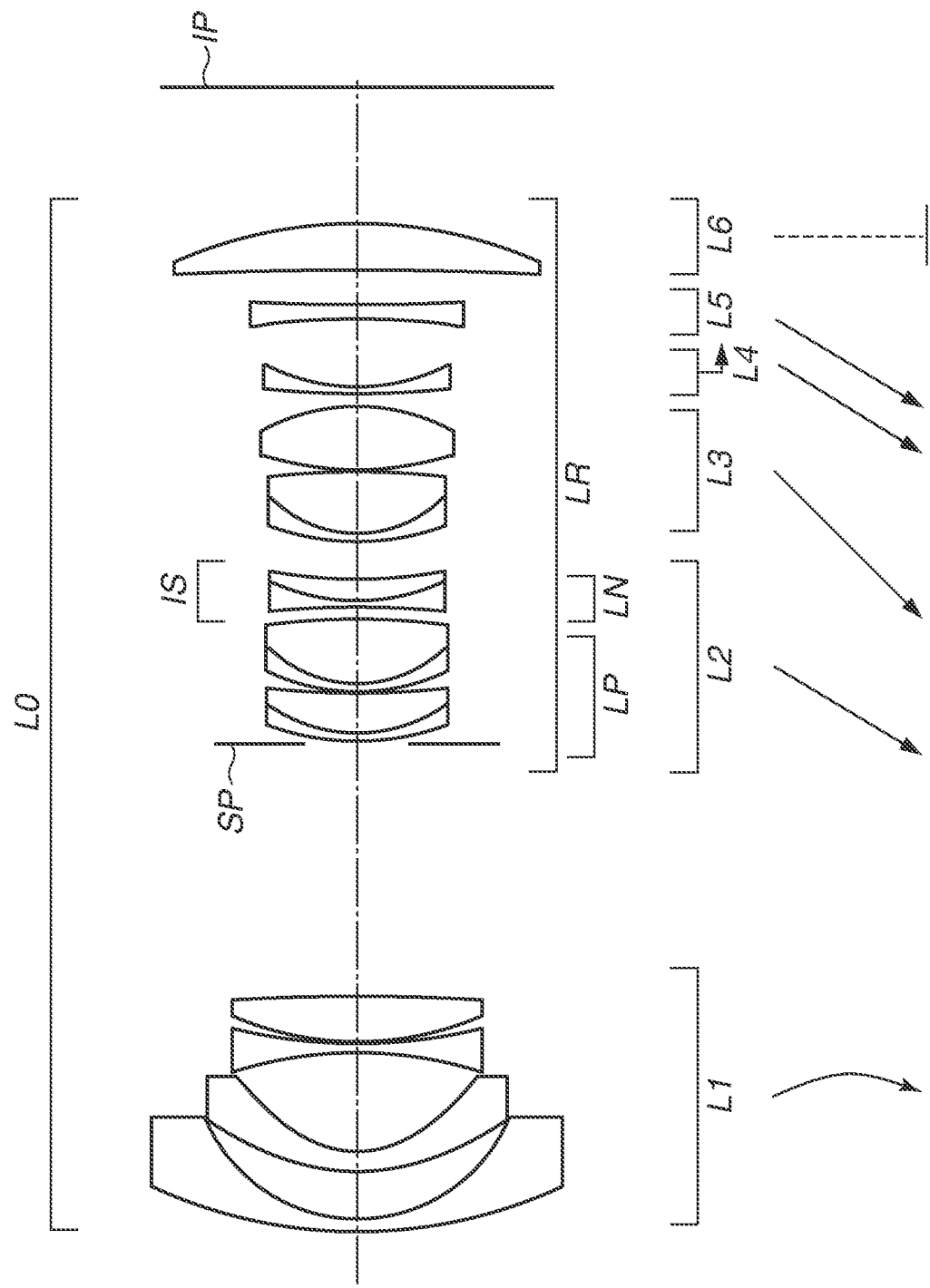

ZOOM LENS AND IMAGING APPARATUS INCLUDING THE SAME

BACKGROUND OF THE DISCLOSURE

Field of the Disclosure

The aspect of the embodiments relates to a zoom lens suitable for an imaging apparatus, such as a digital video camera, a digital still camera, a broadcasting camera, a silver halide film camera, a surveillance camera, or an in-vehicle camera.

Description of the Related Art

A zoom lens having an image stabilization function is known.

International Patent Application Publication No. 2018/012624 discusses a zoom lens having a five-group configuration in which lens groups having negative, positive, positive, negative, and positive refractive powers are disposed in order from an object side to an image side. In the zoom lens discussed in International Patent Application Publication No. 2018/012624, some lenses of the fourth lens group serve as an image stabilization mechanism.

International Patent Application Publication No. 2016/121945 discusses a zoom lens having a four-group configuration in which lens groups having negative, positive, negative, and positive refractive powers are disposed in order from an object side to an image side. In the zoom lens discussed in International Patent Application Publication No. 2016/121945, some lenses of the third lens group serve as an image stabilization mechanism.

In each of the zoom lenses discussed in International Patent Application Publication No. 2018/012624 and International Patent Application Publication No. 2016/121945, however, there is room for improvement in the configuration and the arrangement of the image stabilization lens group in terms of downsizing, widening the angle of view, and keeping optical performance in image stabilization.

SUMMARY OF THE DISCLOSURE

According to an aspect of the embodiments, a zoom lens includes a first lens group and a rear group disposed in order from an object side to an image side, wherein the first lens group has a negative refractive power and the rear group has a positive refractive power as a whole, wherein a distance between the first lens group and the rear group changes in zooming, wherein the rear group includes a partial group LP that is disposed at a position closest to the object side among groups of the rear group and has a positive refractive power, a partial group LN that is disposed adjacent to and on the image side of the partial group LP and has a negative refractive power, and two or more lens groups that are disposed on the image side of the partial group LN and between which distances change in zooming, wherein when image blur is corrected, the partial group LN moves in a direction including a component of a direction perpendicular to an optical axis, wherein the zoom lens includes an aperture stop disposed on the object side of the partial group LP or within the partial group LP, and wherein a lens surface closest to the object side among lens surfaces of the partial group LN and a lens surface closest to the image side among the lens surfaces of the partial group LN are both concave surfaces.

Further features of the disclosure will become apparent from the following description of exemplary embodiments with reference to the attached drawings.

BRIEF DESCRIPTION OF THE DRAWINGS

FIGS. 2A and 2B are longitudinal aberration diagrams of the zoom lens in Example 1.

FIG. 7 is a cross-sectional view of a zoom lens in Example 3.

DESCRIPTION OF THE EMBODIMENTS

Exemplary embodiments of a zoom lens and an imaging apparatus including the same according to the disclosure will be described below with reference to the attached drawings.

FIGS. 1, 4, 7, and 10 are cross-sectional views of zoom lenses L0 in Examples 1 to 4, respectively, when each of the zoom lenses L0 is at the wide angle end and focuses on infinity.

The zoom lens L0 in each of Examples can be used in an imaging apparatus, such as a digital video camera, a digital still camera, a broadcasting camera, a silver halide film camera, a surveillance camera, and an in-vehicle camera. The zoom lens L0 in each of Examples can also be used as a projection lens of a projector.

In each of the lens cross-sectional views, the left is an object side (the front), and the right is an image side (the rear). In each of the lens cross-sectional views, Li indicates an i-th lens group where i represents a position in the order of lens groups counted from the object side. In the specification of the present application, a "lens group" refers to a set of lenses that integrally moves or stays at rest in zooming. A lens group may include a single lens, or may include a plurality of lenses. A lens group may include an element (e.g., an aperture stop) other than a lens. A rear group LR includes all lens groups disposed on the image side with respect to a first lens group L1.

Each of the lens cross-sectional views illustrates an aperture stop SP, a sub-stop (auxiliary stop) FC, and an image plane IP. On the image plane IP, a light-receiving surface of a solid-state image sensor (a photoelectric conversion element), such as a charge-coupled device (CCD) sensor and a complementary metal-oxide-semiconductor (CMOS) sensor, or a photosensitive surface of a film is disposed. In each example, the aperture stop SP is provided on the object side of a second lens group L2 or within the second lens group L2. A partial group (image stabilization group) IS has a function of correcting image blur (an image stabilization function) by moving in a direction including a component of a direction perpendicular to the optical axis. In the specification of the present application, a "partial group" refers to a set of lenses having a configuration length (the distance from the lens surface closest to the object side of the partial group to the lens surface closest to the image side of the partial group) not to be changed in zooming. That is, a partial group can be a single lens group or a part of a single lens group.

Each of the lens cross-sectional views illustrates moving trajectories of lens groups in zooming from the wide angle end to the telephoto end, and moving directions of lenses in focusing from infinity to a close distance.

Figure 1:
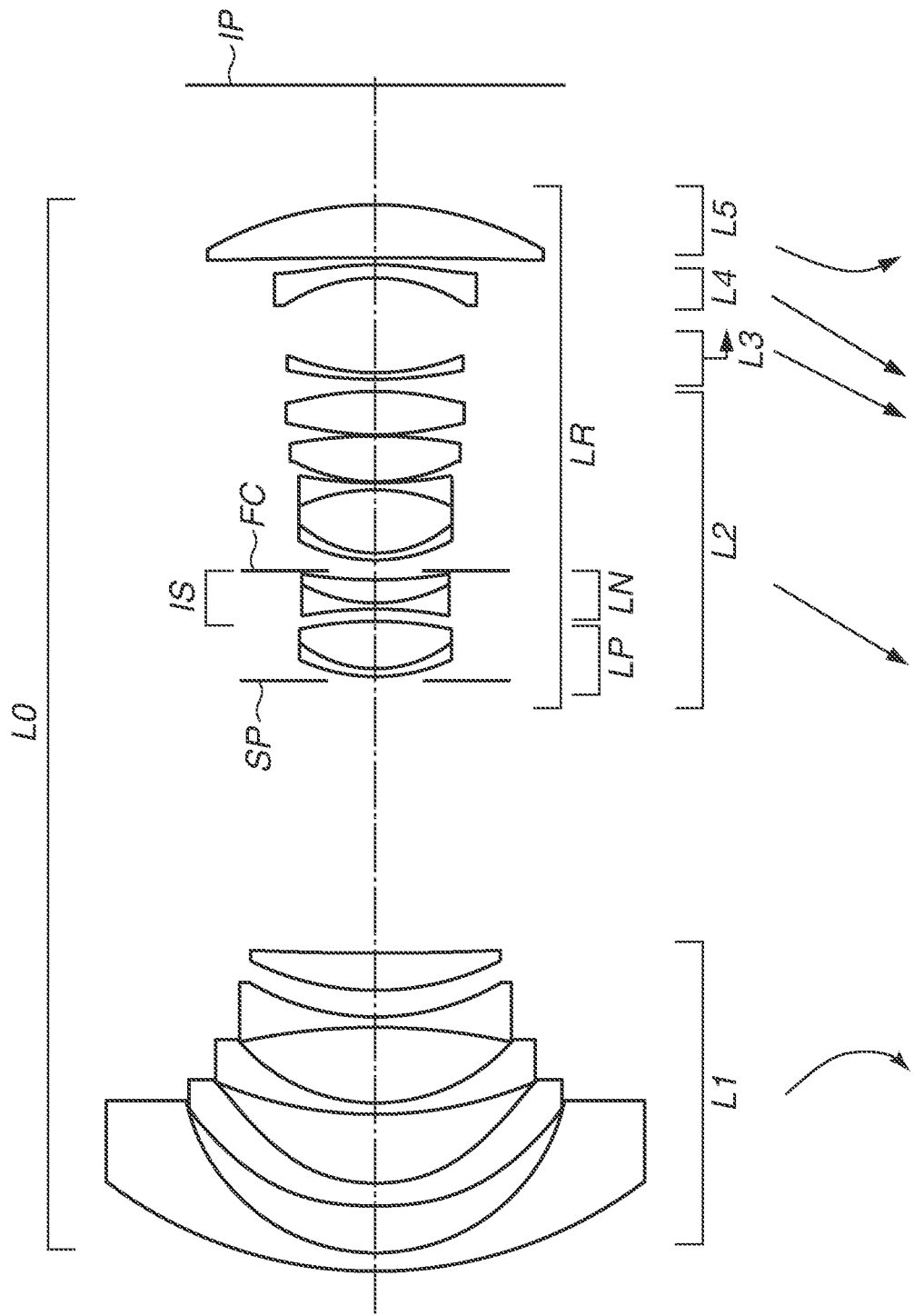
FIG. 1 is a cross-sectional view of a zoom lens in Example 1.
Figure 3A:
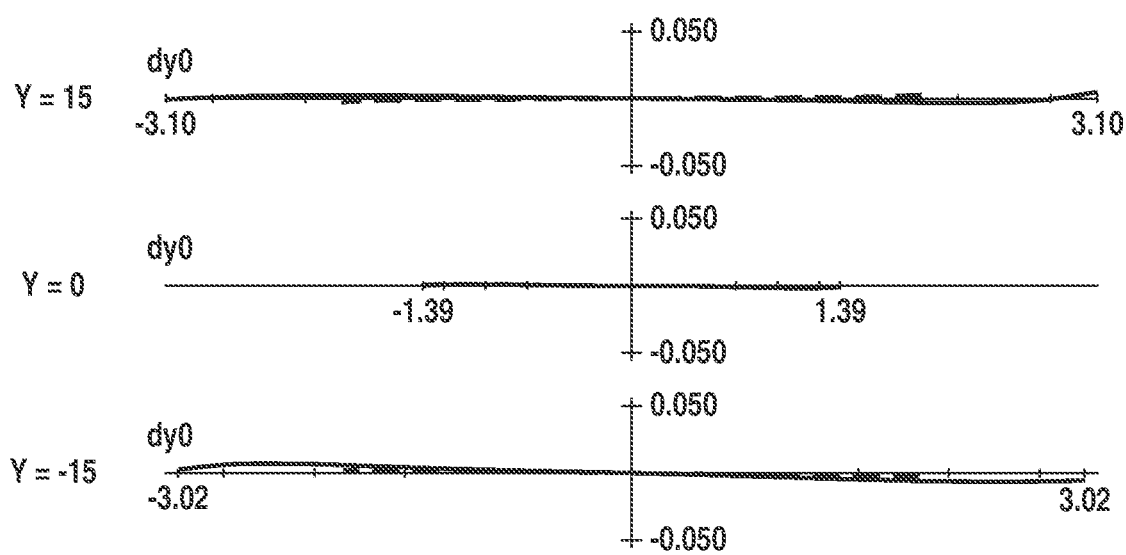
FIGS. 3A and 3B are lateral aberration diagrams of the zoom lens in Example 1 in image stabilization.
Figure 3B:
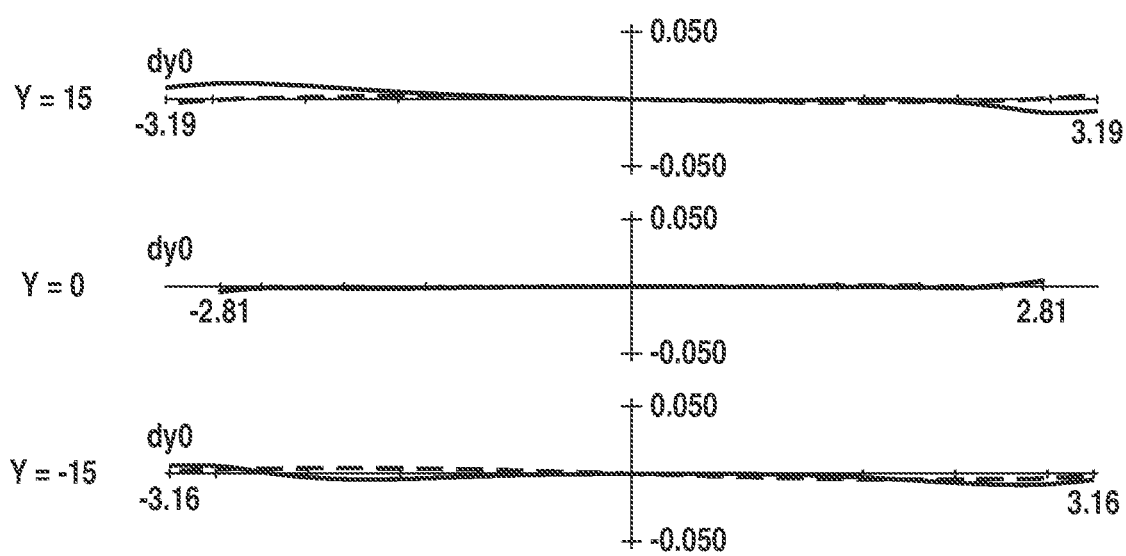

The zoom lens L0 in Example 1 illustrated in FIG. 1 includes a first lens group L1 having a negative refractive power, a second lens group L2 having a positive refractive power, a third lens group L3 having a negative refractive power, a fourth lens group L4 having a negative refractive power, and a fifth lens group L5 having a positive refractive power. In the zoom lens L0 in Example 1, a partial group LN that is a part of the second lens group L2 serves as an image stabilization group. In the zoom lens L0 in Example 1, in zooming from the wide angle end to the telephoto end, the first lens group L1 moves to the image side and then moves to the object side as indicated by an arrow. The second lens group L2 moves to the object side while decreasing the distance to the first lens group L1. The third lens group L3 moves to the object side while increasing the distance to the second lens group L2. The fourth lens group L4 moves to the object side while decreasing the distance to the third lens group L3. The fifth lens group L5 moves to the object side while increasing the distance to the fourth lens group L4 and then moves to the image side. In focusing from an object at infinity to an object at a close distance, the third lens group L3 moves to the image side.

Figure 4:
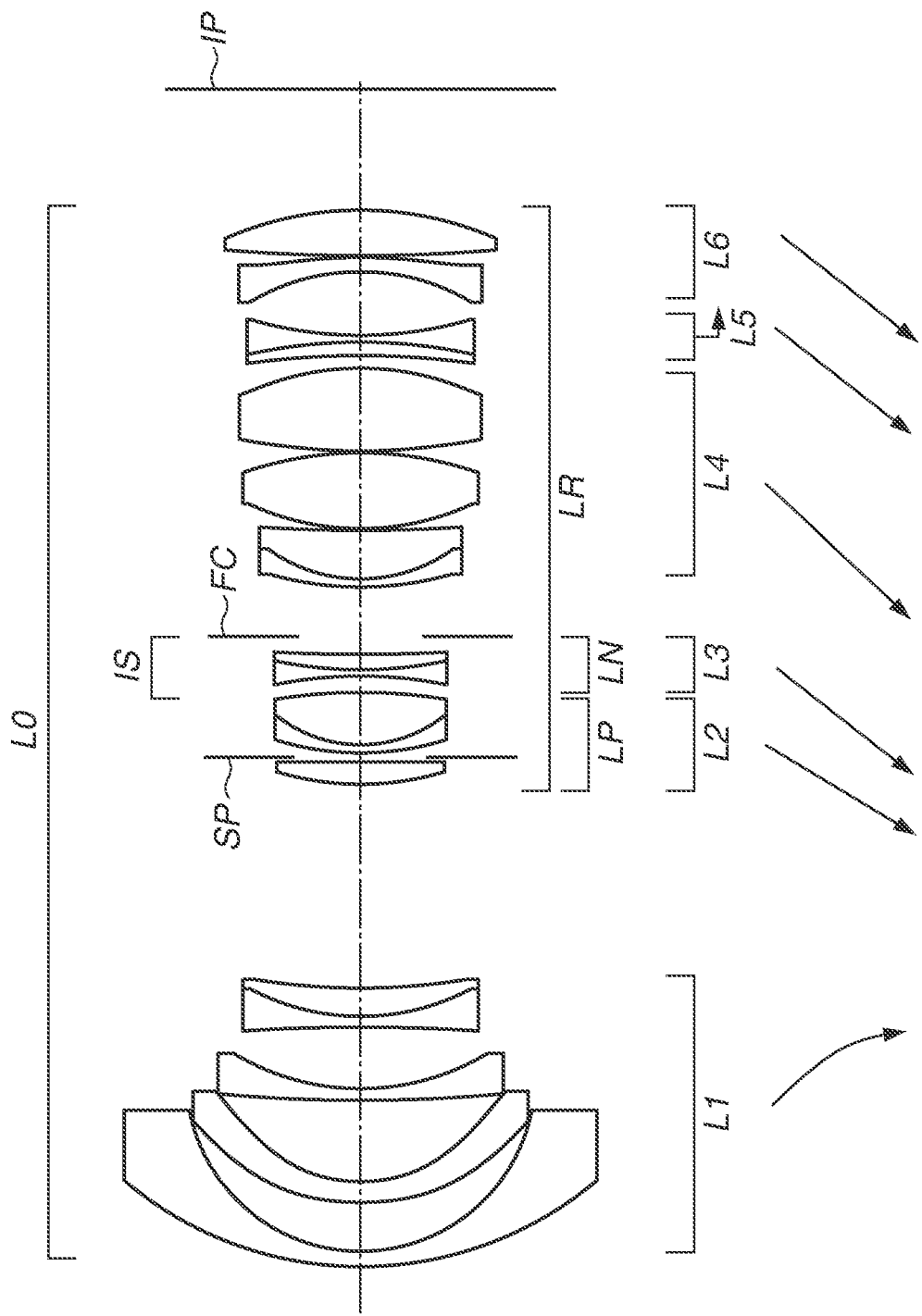
FIG. 4 is a cross-sectional view of a zoom lens in Example 2.
Figure 5A:
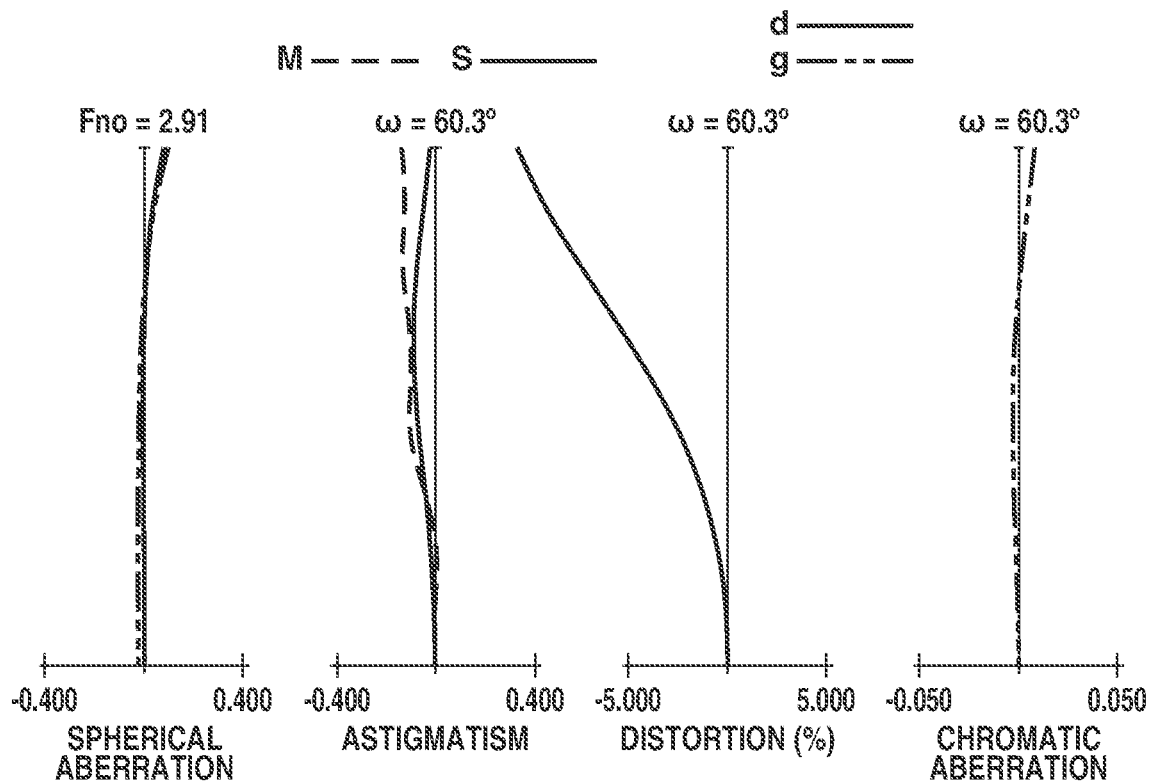
FIGS. 5A and 5B are longitudinal aberration diagrams of the zoom lens in Example 2.
Figure 5B:
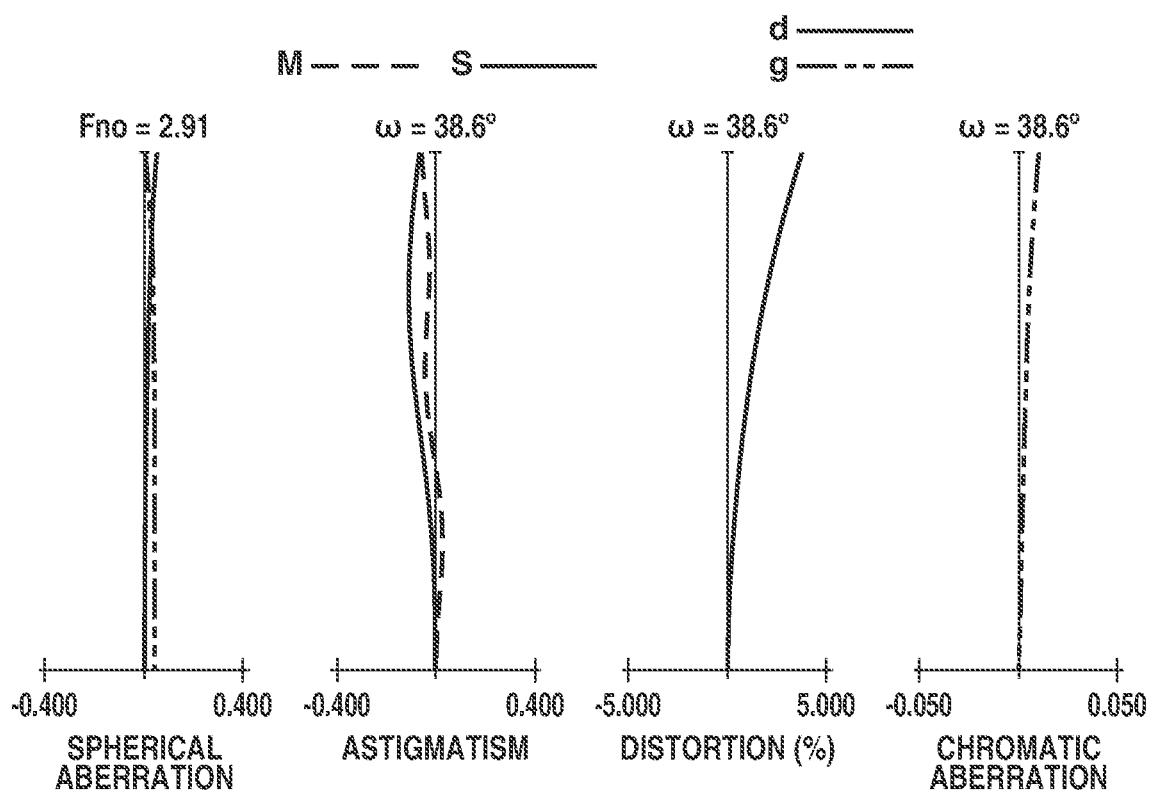
Figure 6A:
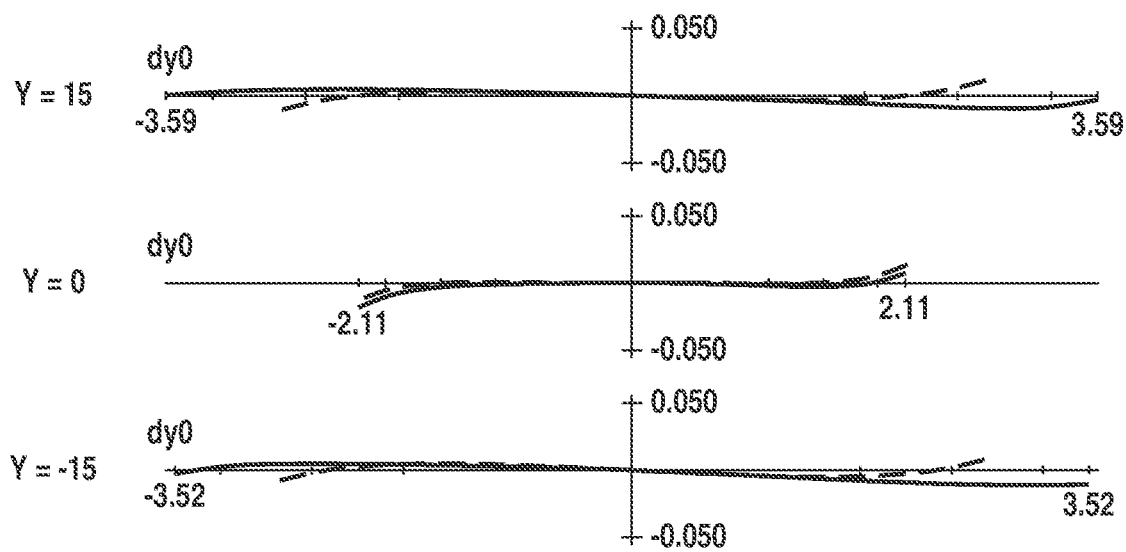
FIGS. 6A and 6B are lateral aberration diagrams of the zoom lens in Example 2 in image stabilization.
Figure 6B:
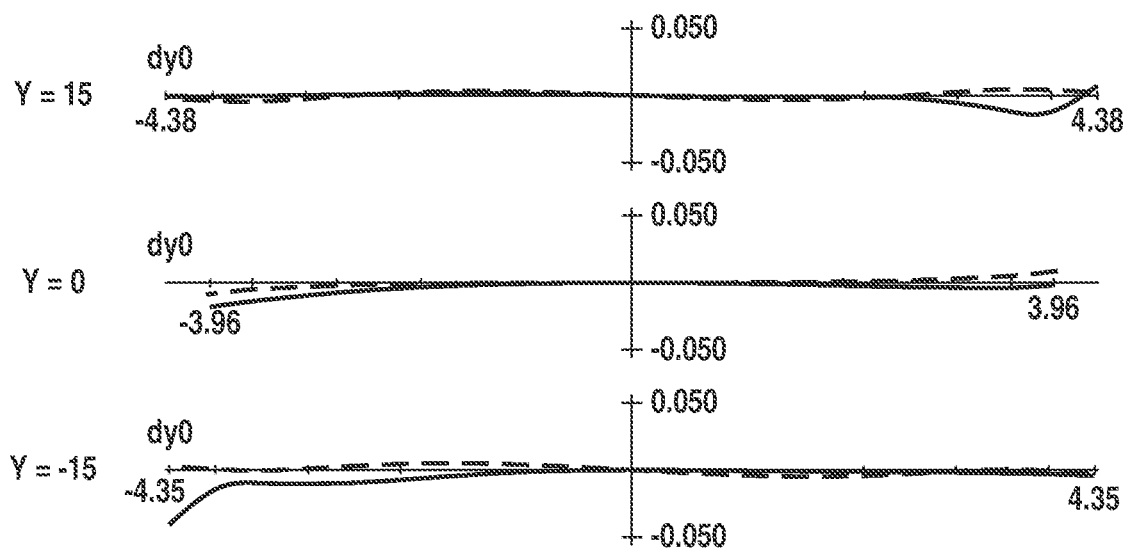
Figure 8A:
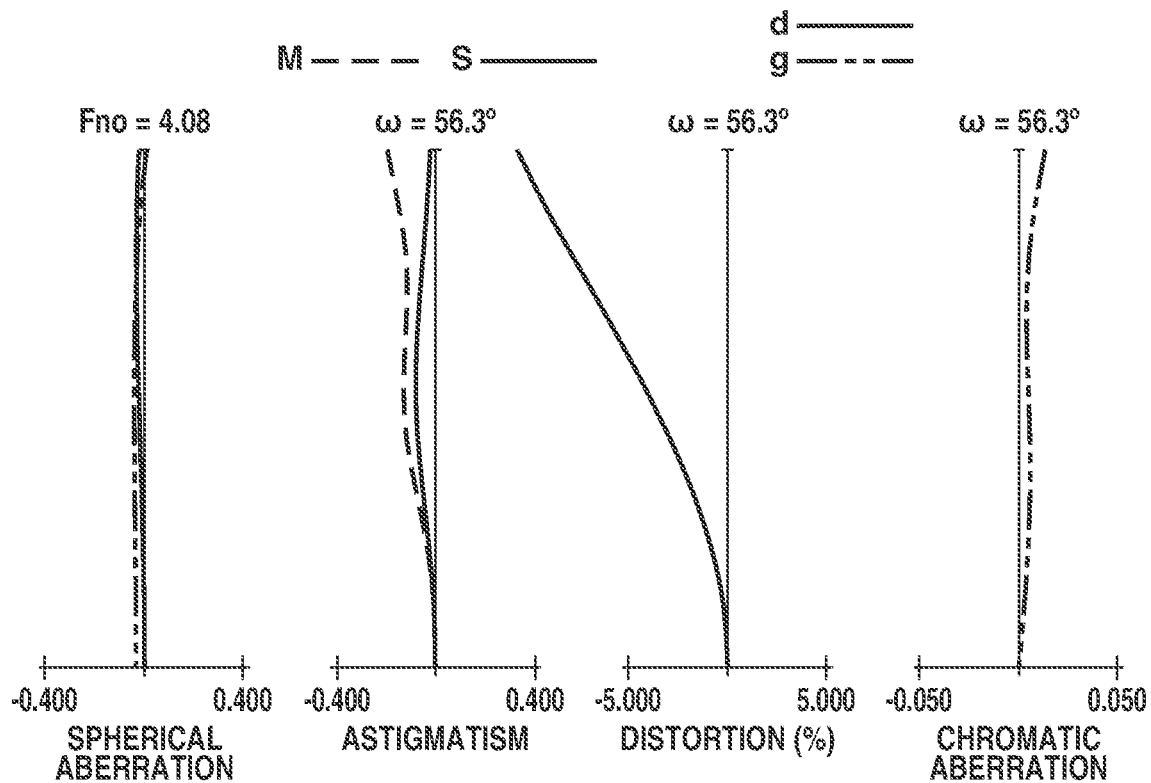
FIGS. 8A and 8B are longitudinal aberration diagrams of the zoom lens in Example 3.
Figure 8B:
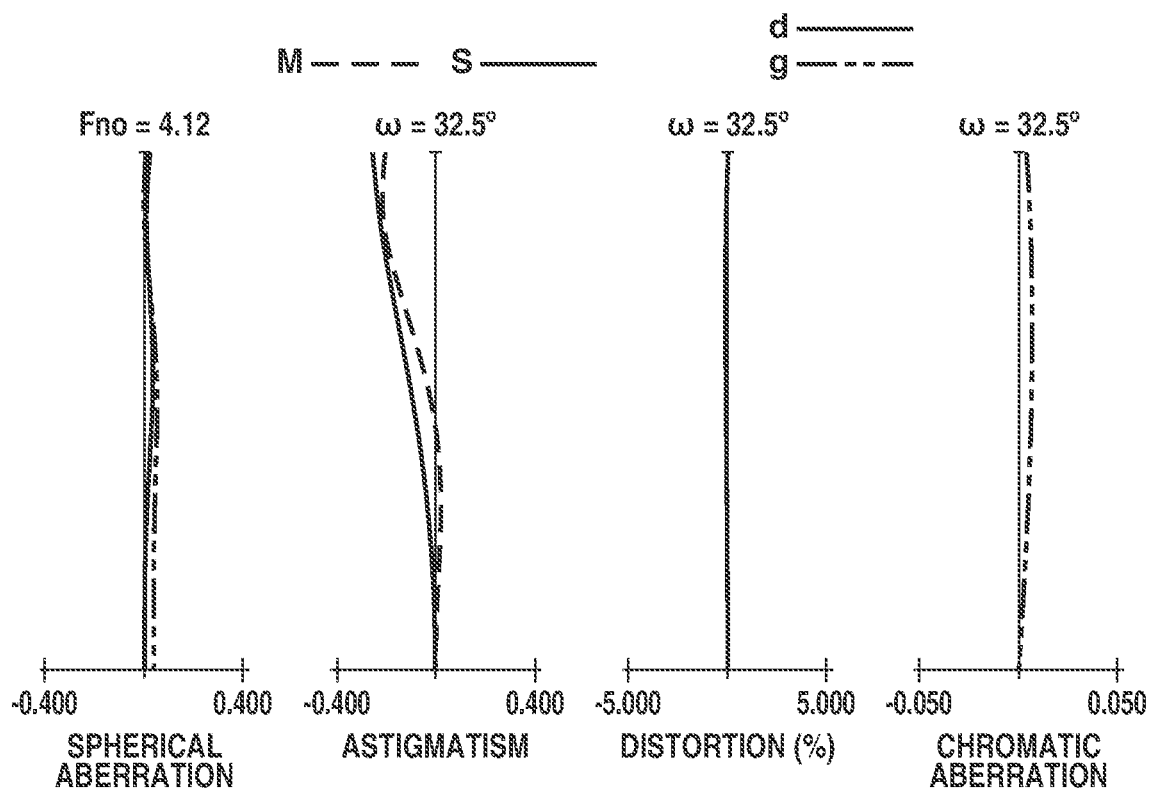
Figure 9A:
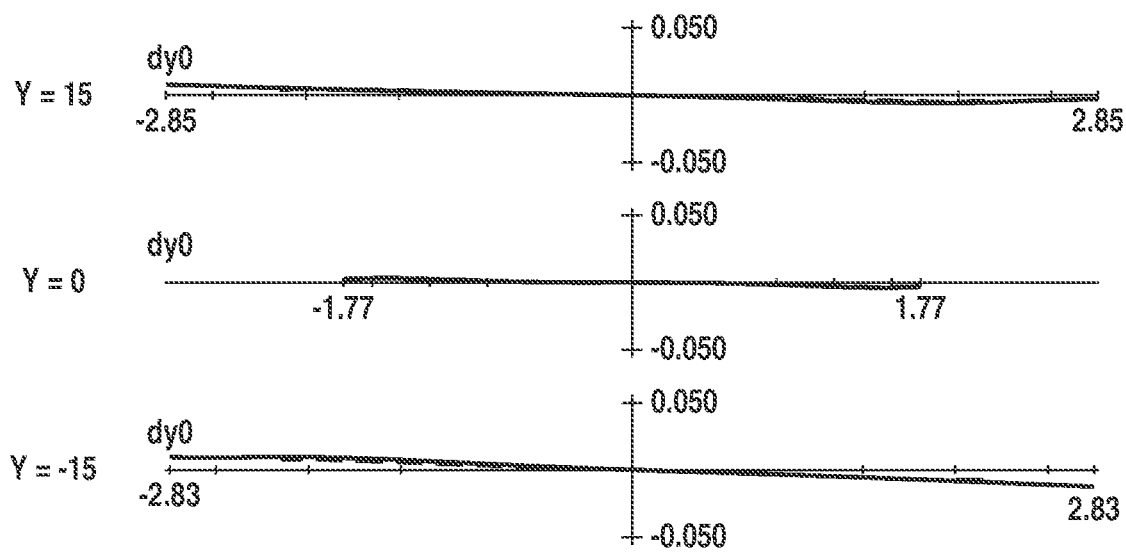
FIGS. 9A and 9B are lateral aberration diagrams of the zoom lens in Example 3 in image stabilization.
Figure 9B:
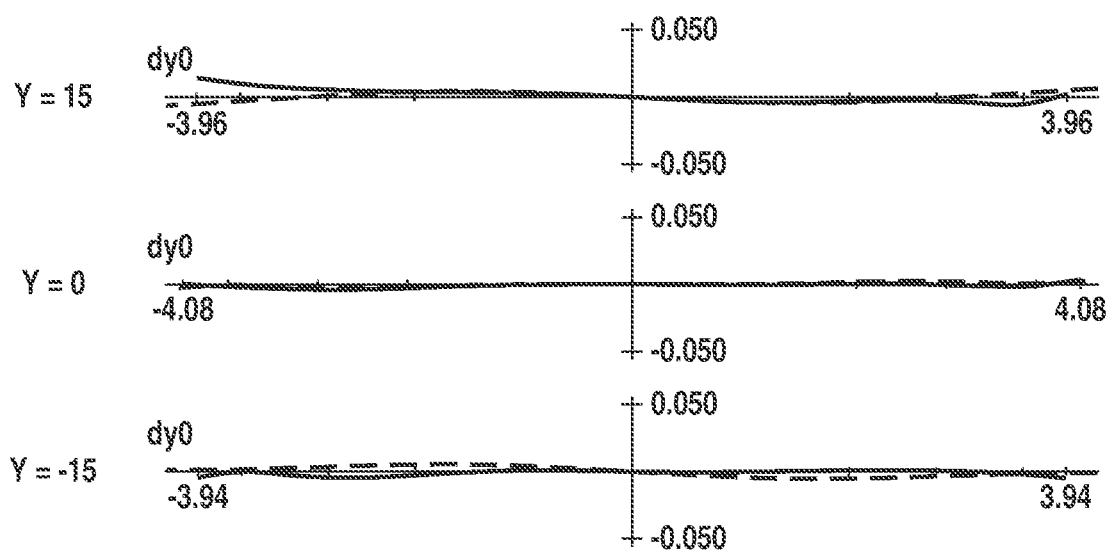

The zoom lens L0 in Example 2 illustrated in FIG. 4 includes a first lens group L1 having a negative refractive power, a second lens group L2 having a positive refractive power, a third lens group L3 having a negative refractive power, a fourth lens group L4 having a positive refractive power, a fifth lens group L5 having a negative refractive power, and a sixth lens group L6 having a positive refractive power. In the zoom lens L0 in Example 2, a partial group LN that corresponds to the third lens group L3 serves as an image stabilization group. In the zoom lens L0 in Example 2, in zooming from the wide angle end to the telephoto end, the first lens group L1 moves to the image side as indicated by an arrow. The second lens group L2 moves to the object side while decreasing the distance to the first lens group L1. The third lens group L3 moves to the object side while decreasing the distance to the second lens group L2. The fourth lens group L4 moves to the object side while decreasing the distance to the third lens group L3. The fifth lens group L5 moves to the object side while increasing the distance to the fourth lens group L4. The sixth lens group L6 moves to the object side while increasing the distance to the fifth lens group L5. In focusing from an object at infinity to an object at a close distance, the fifth lens group L5 moves to the image side.

The zoom lens L0 in Example 3 illustrated in FIG. 7 includes a first lens group L1 having a negative refractive power, a second lens group L2 having a positive refractive power, a third lens group L3 having a positive refractive power, a fourth lens group L4 having a negative refractive power, a fifth lens group L5 having a negative refractive power, and a sixth lens group L6 having a positive refractive power. In the zoom lens L0 in Example 3, a partial group LN that is a part of the second lens group L2 serves as an image stabilization group. In the zoom lens L0 in Example 3, in zooming from the wide angle end to the telephoto end, the first lens group L1 moves to the image side and then moves to the object side as indicated by an arrow. The second lens group L2 moves to the object side while decreasing the distance to the first lens group L1. The third lens group L3 moves to the object side while decreasing the distance to the second lens group L2. The fourth lens group L4 moves to the object side while increasing the distance to the third lens group L3. The fifth lens group L5 moves to the object side while decreasing the distance to the fourth lens group L4. The sixth lens group L6 does not move in zooming. In focusing from an object at infinity to an object at a close distance, the fourth lens group L4 moves to the image side.

Figure 10:
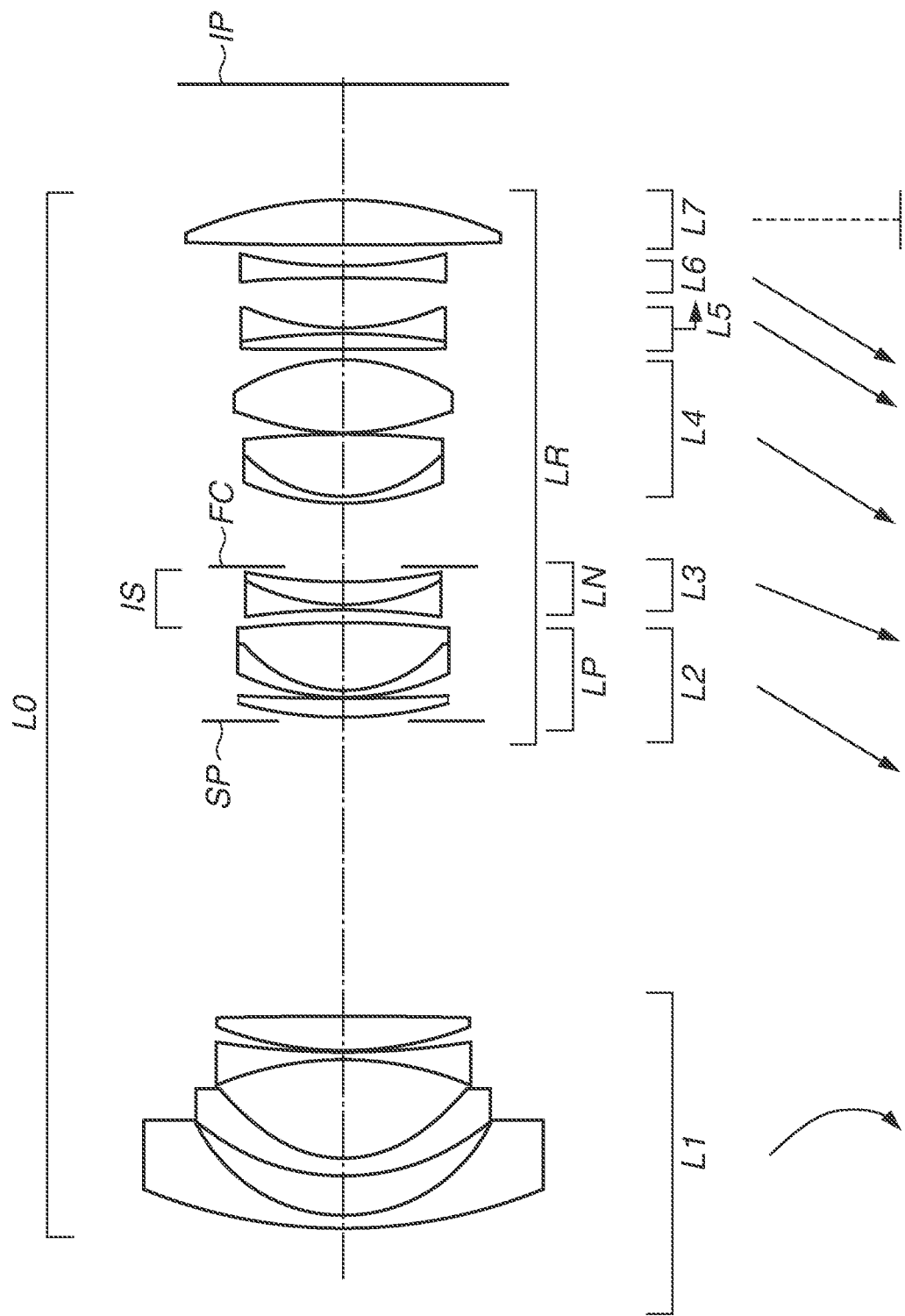
FIG. 10 is a cross-sectional view of a zoom lens in Example 4.
Figure 11A:
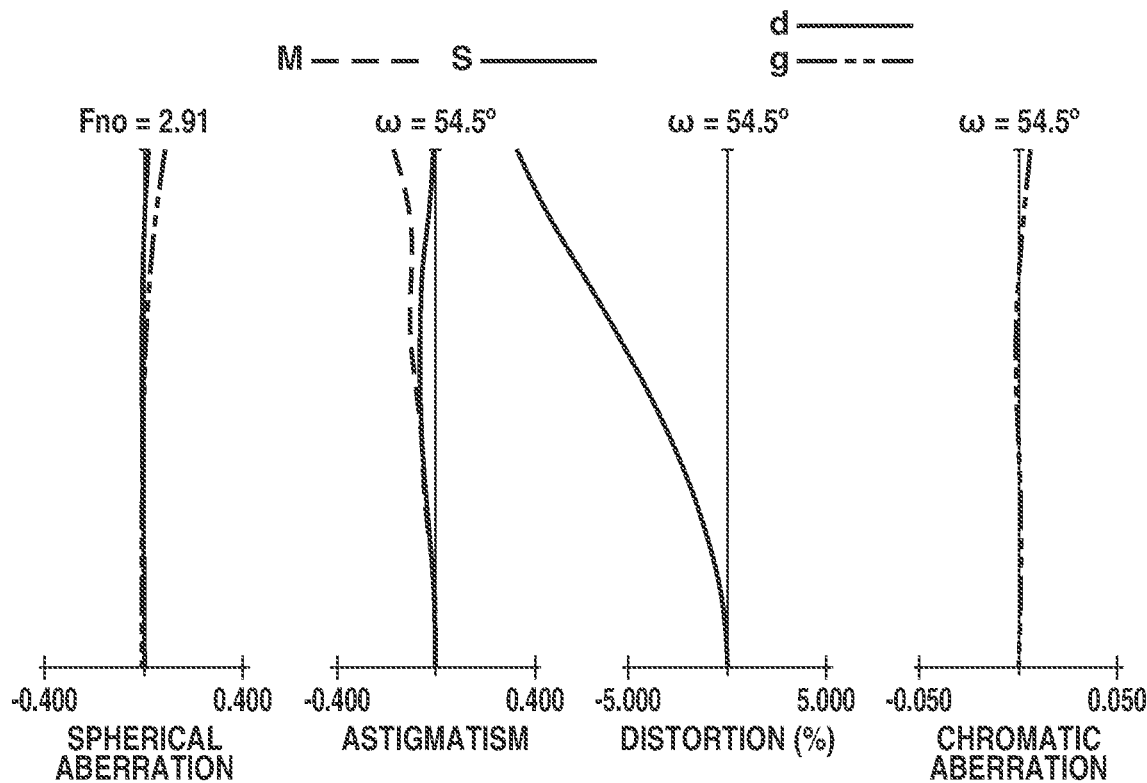
FIGS. 11A and 11B are longitudinal aberration diagrams of the zoom lens in Example 4.
Figure 11B:
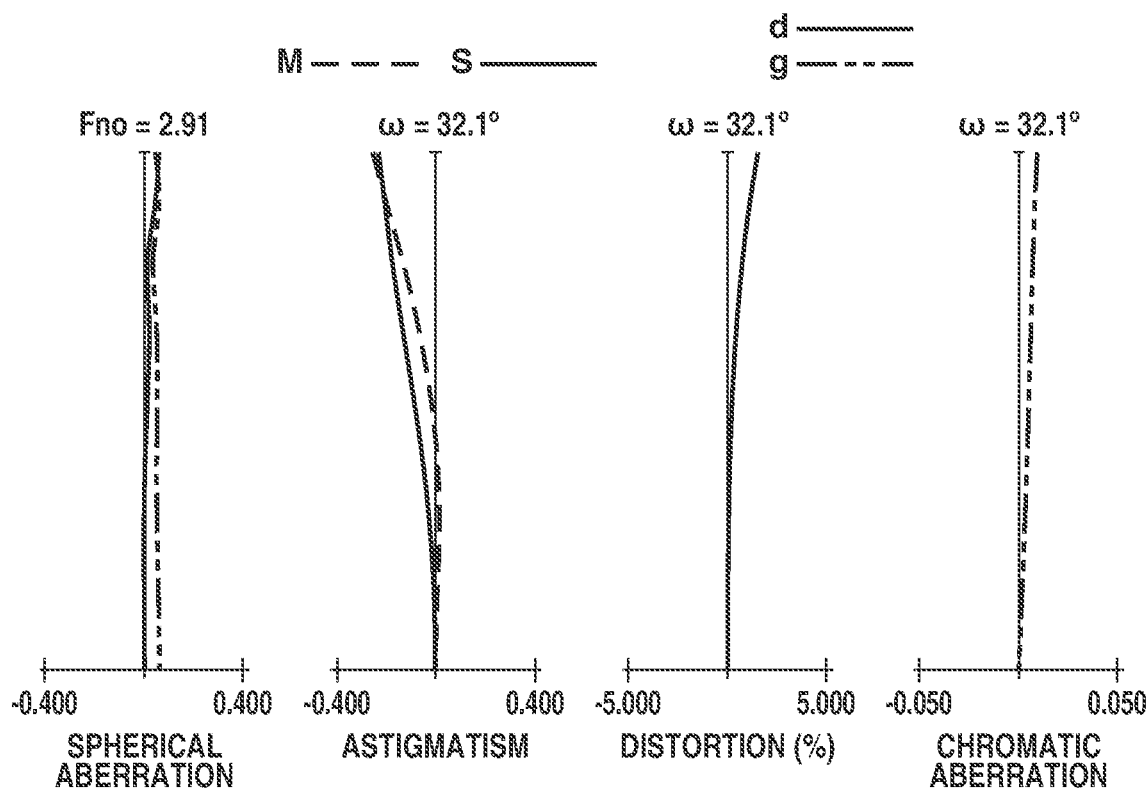
Figure 12A:
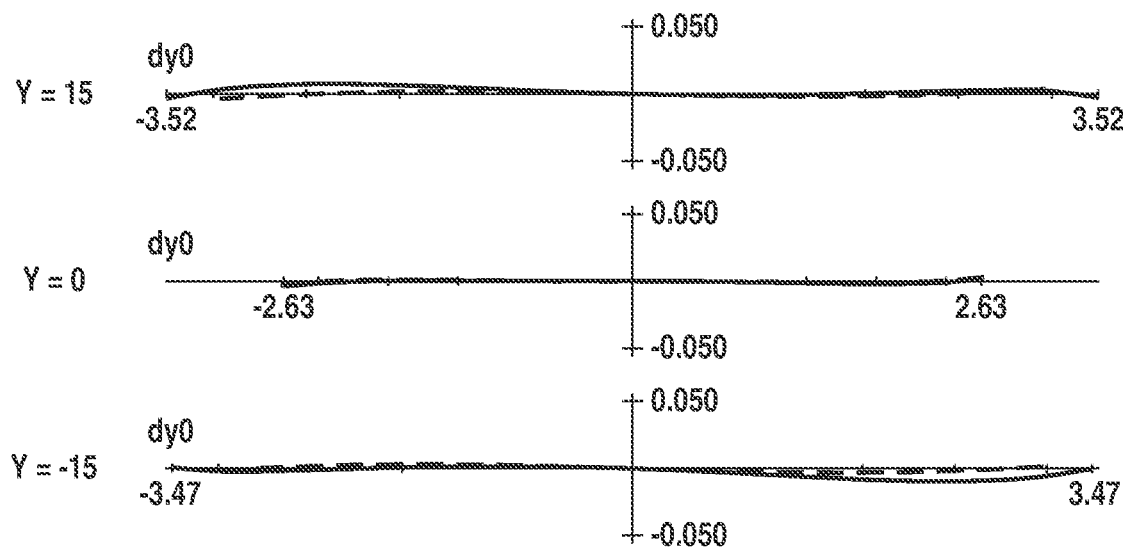
FIGS. 12A and 12B are lateral aberration diagrams of the zoom lens in Example 4 in image stabilization.
Figure 12B:
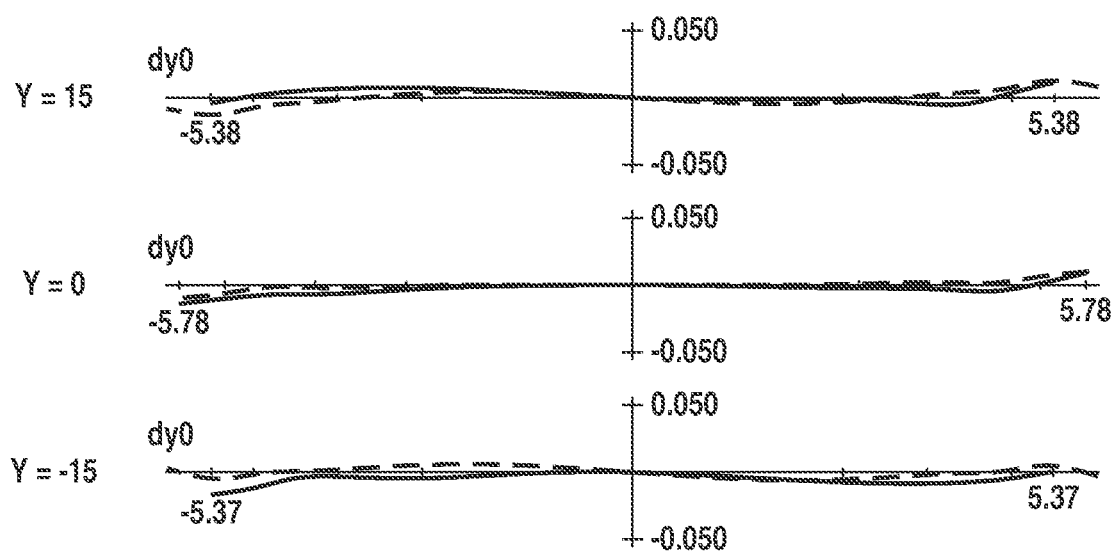

The zoom lens L0 in Example 4 illustrated in FIG. 10 includes a first lens group L1 having a negative refractive power, a second lens group L2 having a positive refractive power, a third lens group L3 having a negative refractive power, a fourth lens group L4 having a positive refractive power, a fifth lens group L5 having a negative refractive power, a sixth lens group L6 having a negative refractive power, and a seventh lens group L7 having a positive refractive power. In the zoom lens L0 in Example 4, a partial group LN that corresponds to the third lens group L3 serves as an image stabilization group. In the zoom lens L0 in Example 4, in zooming from the wide angle end to the telephoto end, the first lens group L1 moves to the image side and then moves to the object side as indicated by an arrow. The second lens group L2 moves to the object side while decreasing the distance to the first lens group L1. The third lens group L3 moves to the object side while increasing the distance to the second lens group L2. The fourth lens group L4 moves to the object side while decreasing the distance to the third lens group L3. The fifth lens group L5 moves to the object side while increasing the distance to the fourth lens group L4. The sixth lens group L6 moves to the object side while decreasing the distance to the fifth lens group L5.

The seventh lens group L7 does not move in zooming. In focusing from an object at infinity to an object at a close distance, the fifth lens group L5 moves to the image side.

While a single particular lens group moves in focusing in each of Examples, the form of focusing is not limited to this. A part of a lens group may move in focusing, or the entire configuration of the zoom lens L0 may move. A plurality of lenses may move along different trajectories from each other in focusing.

FIGS. 2A and 2B, FIGS. 5A and 5B, FIGS. 8A and 8B, and FIGS. 11A and 11B are longitudinal aberration diagrams of the zoom lenses L0 in Examples 1 to 4, respectively. The longitudinal aberration diagrams in FIGS. 2A, 5A, 8A, and 11A illustrate the amounts of aberration at the wide angle end, and the longitudinal aberration diagrams in FIGS. 2B, 5B, 8B, and 11B illustrate the amounts of aberration at the telephoto end. In each longitudinal aberration diagram, d represents the d-line, and g represents the g-line. M represents a meridional image plane, and S represents a sagittal image plane. Magnification chromatic aberration is represented by the g-line. ω represents the half angle of view, and Fno represents the F-number.

FIGS. 3A and 3B, FIGS. 6A and 6B, FIGS. 9A and 9B, and FIGS. 12A and 12B are lateral aberration diagrams of the zoom lenses L0 in Examples 1 to 4, respectively, when image stabilization for 0.3° is performed. The lateral aberration diagrams in FIGS. 3A, 6A, 9A, and 12A illustrate the amounts of aberration at the wide angle end, and the lateral aberration diagrams in FIGS. 3B, 6B, 9B, and 12B illustrate the amounts of aberration at the telephoto end. In each figure, Y represents an image height (mm) obtained by evaluating a lateral aberration diagram. The unit of each axis in the lateral aberration diagram is mm.

Next, the features of the zoom lens L0 in each example are described.

The zoom lens L0 in each of the Examples is a so-called negative lead type zoom lens in which the refractive power of the first lens group L1 is negative. A negative lead type zoom lens is known as a configuration effective particularly in widening the angle of the zoom lens.

In a negative lead type zoom lens, to achieve both the downsizing and widening the angle of the zoom lens at a high level, it is important to appropriately set a refractive power and a lens configuration of each lens group and movement conditions for each lens group in zooming.

To downsize a lens configuration, the outside diameter of the lens (the effective diameter of the lens) is made small. To use the lens having a small outside diameter, light on the light incident side of the lens is sufficiently converged. That is, to downsize a predetermined lens group, a lens group having a positive refractive power is disposed on the object side of the predetermined lens group.

In the zoom lens L0 in each of Examples, a partial group LP having a positive refractive power is disposed adjacent to and on the object side of the partial group LN having a negative refractive power serving as the image stabilization group. In this configuration, downsizing of the partial group LN as the image stabilization group can be achieved.

Further, the lens surface closest to the object side among lens surfaces of the partial group LN and the lens surface closest to the image side among the lens surfaces of the partial group LN are both concave surfaces. That is, the partial group LN is shaped in such a manner that the surface closest to the object side directs its concave surface to the object side, and the surface closest to the image side directs its concave surface to the image side. This can excellently correct (reduce or prevent) fluctuations in comatic aberration and field curvature when the partial group LN moves in image stabilization.

In the rear group LR of the zoom lens L0 in each of Examples, the partial group LP is disposed at the position closest to the object side, the partial group LN is disposed adjacent to and on the image side of the partial group LP, and the other lens groups are disposed on the image side of the partial group LN. That is, the partial group LN serving as the image stabilization group is disposed relatively on the object side of the rear group LR and near the center of the rear group LR. In this configuration, the height of an off-axis ray incident on the partial group LN serving as the image stabilization group can be lowered. Thus, deterioration of optical performance in image stabilization can be reduced or prevented.

With the above-described configuration, the zoom lens L0 in each of Examples can achieve both downsizing and widening of the angle of the zoom lens and also keep high optical performance even in image stabilization.

In the zoom lens L0 in each of Examples, two or more lens groups between which distances change in zooming may be disposed on the image side of the partial group LN. In this configuration, the angle (e.g., an angle of view of 100° or more at the wide angle end) can be sufficiently widened and a sufficient magnification ratio (e.g., twice) can be also achieved, in each of Examples.

In one embodiment, the zoom lens L0 in each of Examples satisfies one or more of the following inequalities.

$$-4.0 < fLN/ft < -1.0 \tag{1}$$

$$0.8 < fLP/ft < 1.8 \tag{2}$$

$$-2.4 < fLN/fLP < -0.8 \tag{3}$$

$$30 < vLN < 60 \tag{4}$$

$$-1.0 < (r1+r2)/(r1-r2) < 1.0 \tag{5}$$

$$0.00 < dLN/dt < 0.25 \tag{6}$$

$$-2.2 < f1/fw < -1.0 \tag{7}$$

$$-2.2 < f1/skw < -0.9 \tag{8}$$

In these inequalities, fLN is the focal length of the partial group LN. ft is the focal length of the entire system of the zoom lens L0 at the telephoto end. fLP is the focal length of the partial group LP. fw is the focal length of the entire system of the zoom lens L0 at the wide angle end. vLN is the Abbe number of a negative lens included in the partial group LN. r1 is the radius of curvature of the lens surface closest to the object side among the lens surfaces of the partial group LN. r2 is the radius of curvature of the lens surface closest to the image side among the lens surfaces of the partial group LN. dLN is the distance on the optical axis from the lens surface closest to the object side among the lens surfaces of the rear group LR to the lens surface closest to the object side among the lens surfaces of the partial group LN at the telephoto end. dt is the entire lens length of the zoom lens L0 at the telephoto end (the distance on the optical axis from the lens surface closest to the object side to the image plane IP). f1 is the focal length of the first lens group L1. skw is the back focus of the zoom lens L0 at the wide angle end.

Inequality (1) defines the refractive power of the partial group LN serving as the image stabilization group. Inequality (1) is satisfied, whereby it is possible to achieve both downsizing the lens outside diameter and a reduction in fluctuations in aberration in image stabilization. If fLN/ft exceeds the upper limit of conditional expression (1) and the refractive power of the partial group LN is too strong, it is difficult to reduce fluctuations in comatic aberration and field curvature in image stabilization.

If fLN/ft falls below the lower limit of inequality (1) and the refractive power of the partial group LN is too weak, the amount of movement of the partial group LN in image stabilization becomes too large, and it is difficult to downsize the lens outside diameter.

Inequality (2) defines the refractive power of the partial group LP. If fLP/ft exceeds the upper limit of inequality (2) and the refractive power of the partial group LP is too strong, it is difficult to correct spherical aberration at the telephoto end. If fLP/ft falls below the lower limit of inequality (2) and the refractive power of the partial group LP is too weak, an on-axis ray divergent from the first lens group L1 is not sufficiently converged through the partial group LP. As a result, it is difficult to downsize the lens diameter of the partial group LN.

Inequality (3) defines the ratio between the refractive powers of the partial groups LN and LP. Inequality (3) is satisfied, whereby both downsizing of the lens outside diameter and a reduction in fluctuations in aberration in image stabilization can be achieved. If fLN/fLP exceeds the upper limit of inequality (3) and the refractive power of the partial group LN is too strong relative to that of the partial group LP, it is difficult to reduce fluctuations in comatic aberration and field curvature in image stabilization. If fLN/fLP falls below the lower limit of inequality (3) and the refractive power of the partial group LN is too weak relative to that of the partial group LP, the amount of movement of the partial group LN in image stabilization becomes too large, and it is difficult to downsize the lens outside diameter.

Inequality (4) defines the Abbe number of a negative lens included in the partial group LN. If vLN exceeds the upper limit of inequality (4) and the Abbe number of the negative lens is great, the refractive index tends to be small. In this case, it is difficult to reduce fluctuations in comatic aberration in image stabilization. If vLN falls below the lower limit of inequality (4) and the Abbe number of the negative lens is small, it is difficult to reduce fluctuations in magnification chromatic aberration in image stabilization. The partial group LN including at least one negative lens satisfies inequality (4). However, in one embodiment, all negative lenses included in the partial group LN satisfy inequality (4).

Inequality (5) defines the shape factor of the partial group LN. If (r1+r2)/(r1−r2) exceeds the upper limit of inequality (5) and the partial group LN has a meniscus shape in which a concave surface is directed to the image side, it is difficult to reduce fluctuations in field curvature in image stabilization. If (r1+r2)/(r1−r2) falls below the lower limit of inequality (5) and the partial group LN has a meniscus shape in which a concave surface is directed to the object side, it is difficult to reduce fluctuations in comatic aberration in image stabilization.

Inequality (6) defines the distance from the surface closest to the object side among the surfaces of the rear group LR to the partial group LN at the telephoto end. If dLN/dt exceeds the upper limit of inequality (6) and the distance between the surface closest to the object side among the surfaces of the rear group LR and the partial group LN is too long, it is difficult to reduce fluctuations in comatic aberration in image stabilization. If dLN/dt falls below the lower limit of inequality (6) and the distance between the surface closest to the object side among the surfaces of the rear group LR and the partial group LN is too short, it is difficult to appropriately dispose a driving unit for driving the partial group LN and a driving unit for driving the aperture stop SP.

Inequality (7) defines the focal length of the first lens group L1. If f1/fw exceeds the upper limit of inequality (7) and the refractive power of the first lens group L1 is too strong, the arrangement of the refractive power of the zoom lens L0 becomes highly asymmetric, and it is difficult to correct distortion at the wide angle end. If f1/fw falls below the lower limit of inequality (7) and the refractive power of the first lens group L1 is too weak, it is difficult to achieve a wide angle of view exceeding 100° at the wide angle end. Further, the front lens diameter increases, and the lens outside diameter becomes large.

Inequality (8) defines the ratio between the back focus at the wide angle end and the focal length of the first lens group L1. If f1/skw exceeds the upper limit of inequality (8) and the refractive power of the first lens group L1 is too strong, the arrangement of the refractive power of the zoom lens L0 becomes highly asymmetric, and it is difficult to correct distortion at the wide angle end. If f1/skw falls below the lower limit of inequality (8) and the refractive power of the first lens group L1 is too weak, it is difficult to achieve a wide angle of view exceeding 100° at the wide angle end. Further, the front lens diameter increases, and the lens outside diameter becomes large.

In one embodiment, the ranges of inequalities (1) to (8) are the ranges of the following inequalities (1a) to (8a), respectively. In another embodiment, the ranges of inequalities (1) to (8) are the ranges of inequalities (1b) to (8b), respectively.

$$-3.5 < fLN/ft < -1.3 \quad (1a)$$

$$0.9 < fLP/ft < 1.7 \quad (2a)$$

$$-2.3 < fLN/fLP < -0.9 \quad (3a)$$

$$32 < vLN < 55 \quad (4a)$$

$$-0.8 < (r1+r2)/(r1-r2) < 0.8 \quad (5a)$$

$$0.02 < dLN/dt < 0.20 \quad (6a)$$

$$-2.1 < f1/fw < -1.1 \quad (7a)$$

$$-2.1 < f1/skw < -1.0 \quad (8a)$$

$$-3.0 < fLN/ft < -1.5 \quad (1b)$$

$$1.0 < fLP/ft < 1.6 \quad (2b)$$

$$-2.2 < fLN/fLP < -1.0 \quad (3b)$$

$$34 < vLN < 50 \quad (4b)$$

$$-0.7 < (r1+r2)/(r1-r2) < 0.6 \quad (5b)$$

$$0.04 < dLN/dt < 0.15 \quad (6b)$$

$$-2.0 < f1/fw < -1.2 \quad (7b)$$

$$-2.0 < f1/skw < -1.1 \quad (8b)$$

Next, a description is given of a configuration that is to be satisfied in the zoom lens L0 in each of Examples.

In one embodiment, the partial group LN includes one or more positive lenses and one or more negative lenses. In this configuration, fluctuations in magnification chromatic aberration and fluctuations in field curvature in image stabilization can be effectively reduced or prevented.

In one embodiment, the aperture stop SP is to be provided on the object side of the partial group LP or within the partial group LP. In this configuration, the distance between the aperture stop SP and the partial group LN can be shortened and fluctuations in comatic aberration in image stabilization can be effectively reduced or prevented.

Furthermore, a focus group that moves in focusing is provided on the image side of the partial group LN. In a wide angle zoom lens with a long back focus, it is difficult to dispose a focus group at a position near an image plane. Thus, the wide angle zoom lens employs a configuration in which the focus group is disposed near a stop, and an image stabilization group is disposed near the image plane. In this configuration, however, it is difficult to effectively reduce fluctuations in comatic aberration in image stabilization. On the other hand, the image stabilization group is disposed relatively near the stop, and the focus group is disposed near the image plane, whereby both a reduction in fluctuations in aberration in image stabilization and a reduction in fluctuations in aberration in focusing can be achieved. In the zoom lens L0 in each of Examples, a single lens group is used as a focus group. Alternatively, a part of a single lens group may be used as a focus group. That is, some lenses of a single lens group may be driven as a focus group in focusing.

In one embodiment, as in the zoom lens L0 in each of Examples, the distance between the first lens group L1 and the rear group LR at the wide angle end is to be the longest among the distances between the lens groups in the zoom lens L0. As in the zoom lens L0 in each of Examples, at least three negative lenses are to be successively disposed in the first lens group L1. It is also that the first lens group L1 includes at least one positive lens. It is also that a lens group disposed at the position closest to the image side among the lens groups of the rear group LR has a positive refractive power. It is also that a lens disposed at the position closest to the image side among the lens of the rear group LN is a positive lens. It is also that a lens group disposed at the position closest to the image side among the lens groups of the rear group LN has a positive refractive power, a lens group disposed adjacent to and on the object side of this lens group has a negative refractive power, and the distance between these lens groups is increased in at least some of sections in zooming from the wide angle end to the telephoto end.

Next, numerical Examples 1 to 4 corresponding to Examples 1 to 4, respectively, are illustrated. In each of numerical Examples, a surface number represents a position in the order of optical surfaces counted from the object side. rn is the radius of curvature of an n-th (n is a natural number) optical surface (an n-th surface) counted from the object side, and dn is the distance between the n-th surface and an n+1-th surface. ndm is the refractive index of an m-th optical member, and vdm is the Abbe number of the m-th optical member.

The back focus (BF) is the air conversion distance from the last lens surface to the image plane. The entire lens length is a value obtained by adding the back focus to the distance from the first lens surface to the last lens surface.

In a case where an optical surface is an aspheric surface, the sign "*" is added to the right of the surface number. An aspheric surface shape is represented by $$x = (h^2/R)/[1 + \{1 - (1+k)(h/R)^2\}^{1/2} + A4 \times h^4 + A6 \times h^6 + A8 \times h^8 + A10 \times h^{10} + A12 \times h^{12}$$

where x is the amount of displacement from the surface vertex in the optical axis direction, h is the height from the optical axis in a direction perpendicular to the optical axis, R is the paraxial radius of curvature, k is a conical constant, and A4, A6, A8, A10, and A12 are aspheric surface coefficients corresponding to degrees. In each aspheric surface coefficient, "e±XX" means "×10$^{\pm XX}$".

[Numerical Example 1]
(unit: mm)

Surface Data

| Surface number | r | d | nd | vd | Effective diameter |
|---|---|---|---|---|---|
| 1 | 51.172 | 2.10 | 1.76385 | 48.5 | 60.00 |
| 2 | 22.116 | 5.35 | | | 41.92 |
| 3* | 43.332 | 2.60 | 1.58313 | 59.4 | 41.25 |
| 4* | 20.040 | 7.86 | | | 35.56 |
| 5 | 46.620 | 1.30 | 1.49700 | 81.5 | 35.20 |
| 6 | 20.811 | 8.63 | | | 30.19 |
| 7 | −72.638 | 1.20 | 1.43875 | 94.7 | 29.72 |
| 8 | 28.416 | 3.02 | | | 27.38 |
| 9 | 31.708 | 4.25 | 1.72047 | 34.7 | 27.20 |
| 10 | 299.251 | (variable) | | | 26.57 |
| 11 (Stop) | ∞ | 0.50 | | | 15.47 |
| 12 | 20.518 | 0.90 | 1.90043 | 37.4 | 16.09 |
| 13 | 14.081 | 5.42 | 1.51633 | 64.1 | 15.68 |
| 14 | −41.681 | 1.39 | | | 15.71 |
| 15 | −45.264 | 0.70 | 1.79952 | 42.2 | 15.44 |
| 16 | 17.644 | 2.65 | 2.00069 | 25.5 | 15.61 |
| 17 | 53.947 | 1.00 | | | 15.54 |
| 18 (Auxiliary stop) | ∞ | 1.25 | | | 15.63 |
| 19 | 18.253 | 0.80 | 1.95375 | 32.3 | 16.23 |
| 20 | 12.998 | 7.21 | 1.49700 | 81.5 | 15.66 |
| 21 | −21.295 | 0.80 | 1.72916 | 54.7 | 15.48 |
| 22 | 45.323 | 0.15 | | | 15.64 |
| 23 | 19.970 | 5.19 | 1.43875 | 94.7 | 17.39 |
| 24 | −54.434 | 0.15 | | | 18.22 |
| 25* | 29.740 | 4.95 | 1.49700 | 81.5 | 18.94 |
| 26* | −37.767 | (variable) | | | 19.14 |
| 27 | 50.182 | 0.75 | 1.72916 | 54.7 | 18.86 |
| 28 | 26.486 | (variable) | | | 18.54 |
| 29 | −18.815 | 1.50 | 1.85400 | 40.4 | 19.72 |
| 30* | −37.763 | (variable) | | | 21.83 |
| 31 | −568.191 | 6.05 | 1.49700 | 81.5 | 36.04 |
| 32 | −38.524 | (variable) | 37.01 | | |
| Image plane | ∞ | | | | |

-continued

[Numerical Example 1]
(unit: mm)

Aspheric Surface Data

Third surface
K = 0.00000e+000 A4 = 7.52315e−005 A6 = −2.85004e−007 A8 = 8.08696e−010
A10 = −1.62370e−012 A12 = 2.19074e−015 A14 = −1.39196e−018
Fourth surface
K = −7.00172e−001 A4 = 8.26202e−005 A6 = −2.36130e−007 A8 = −1.14795e−010
A10 = 2.29302e−012 A12 = −5.42273e−015 A14 = 3.67687e−018
Twenty-fifth surface
K = 0.00000e+000 A4 = −4.19009e−005 A6 = −1.88923e−007 A8 = 2.54663e−009
A10 = −2.45675e−011 A12 = 1.85699e−013
Twenty-sixth surface
K = 0.00000e+000 A4 = −3.92596e−006 A6 = −2.00765e−007 A8 = 4.34769e−009
A10 = −4.17031e−011 A12 = 2.70334e−013
Thirtieth surface
K = 0.00000e+000 A4 = 3.55737e−005 A6 = 8.04633e−008 A8 = −5.06048e−011
A10 = −1.92129e−012 A12 = 1.00728e−014

Various Types of Data
Zoom ratio 2.06

|  | Wide angle | Middle | Telephoto |
| --- | --- | --- | --- |
| Focal length | 11.33 | 17.56 | 23.30 |
| F-number | 4.08 | 4.08 | 4.12 |
| Half angle of view (°) | 59.63 | 50.70 | 42.88 |
| Image height | 21.64 | 21.64 | 21.64 |
| Entire lens length | 135.40 | 127.26 | 130.90 |
| BF | 13.63 | 16.01 | 14.26 |
| d10 | 31.08 | 13.08 | 6.86 |
| d26 | 1.40 | 2.76 | 3.05 |
| d28 | 10.82 | 9.46 | 9.16 |
| d30 | 0.80 | 8.28 | 19.88 |
| d32 | 13.63 | 16.01 | 14.26 |

Zoom Lens Group Data

| Group | Start surface | Focal length |
| --- | --- | --- |
| 1 | 1 | −19.57 |
| 2 | 11 | 24.55 |
| 3 | 27 | −77.97 |
| 4 | 29 | −45.57 |
| 5 | 31 | 82.84 |

[Numerical Example 2]
(unit: mm)

Surface Data

| Surface number | r | d | nd | vd | Effective diameter |
| --- | --- | --- | --- | --- | --- |
| 1 | 40.613 | 1.70 | 1.76385 | 48.5 | 51.00 |
| 2 | 19.325 | 5.42 |  |  | 36.63 |
| 3* | 31.250 | 2.30 | 1.58313 | 59.4 | 35.85 |
| 4* | 17.371 | 9.00 |  |  | 30.81 |
| 5 | 169.823 | 1.30 | 1.49700 | 81.5 | 30.26 |
| 6 | 27.182 | 6.81 |  |  | 26.85 |
| 7 | −204.838 | 1.20 | 1.43875 | 94.7 | 24.92 |
| 8 | 26.012 | 3.14 | 1.72047 | 34.7 | 23.15 |
| 9 | 72.443 | (variable) |  |  | 22.50 |
| 10 | 31.749 | 2.47 | 1.54814 | 45.8 | 17.19 |
| 11 | ∞ | 0.50 |  |  | 17.35 |
| 12 (Stop) | ∞ | 0.50 |  |  | 17.44 |
| 13 | 31.532 | 0.90 | 1.81554 | 44.4 | 17.78 |
| 14 | 14.990 | 5.80 | 1.51823 | 58.9 | 17.39 |

-continued

[Numerical Example 2]
(unit: mm)

| | | | | | |
|---|---|---|---|---|---|
| 15 | −58.790 | (variable) | | | 17.59 |
| 16 | −47.567 | 0.70 | 1.72047 | 34.7 | 17.56 |
| 17 | 45.836 | 1.70 | 2.00069 | 25.5 | 17.89 |
| 18 | 176.965 | 2.00 | | | 17.96 |
| 19 (Auxiliary stop) | ∞ | (variable) | | | 18.37 |
| 20 | 36.570 | 0.90 | 1.83481 | 42.7 | 19.05 |
| 21 | 17.537 | 5.37 | 1.43875 | 94.7 | 19.41 |
| 22 | 169.591 | 0.20 | | | 21.16 |
| 23 | 29.382 | 8.39 | 1.43875 | 94.7 | 23.63 |
| 24 | −39.782 | 0.20 | | | 24.89 |
| 25* | 59.282 | 9.17 | 1.49700 | 81.5 | 25.50 |
| 26* | −31.136 | (variable) | | | 25.39 |
| 27 | −91.656 | 1.50 | 2.00069 | 25.5 | 23.92 |
| 28 | −57.835 | 0.75 | 1.72047 | 34.7 | 23.84 |
| 29 | 43.358 | (variable) | | | 23.25 |
| 30* | −27.441 | 1.60 | 1.85400 | 40.4 | 23.53 |
| 31* | −60.934 | 0.20 | | | 25.65 |
| 32 | 178.490 | 5.04 | 1.49700 | 81.5 | 27.62 |
| 33 | −37.343 | (variable) | | | 28.73 |
| Image plane | ∞ | | | | |

Aspheric Surface Data

Third surface
K = 0.00000e+000 A4 = 6.49432e−005 A6 = −2.09847e−007 A8 = 3.22034e−010
A10 = −3.56124e−014 A12 = −2.65892e−016 A14 = −2.11568e−019
Fourth surface
K = −5.81434e−001 A4 = 7.42938e−005 A6 = −8.59222e−008 A8 = −1.56177e−009
A10 = 9.19947e−012 A12 = −2.30787e−014 A14 = 1.96904e−017
Twenty-fifth surface
K = 0.00000e+000 A4 = −1.13378e−005 A6 = −4.96476e−009 A8 = 3.96013e−011
A10 = 5.02938e−013 A12 = 1.73732e−015
Twenty-sixth surface
K = 0.00000e+000 A4 = −6.09923e−006 A6 = 1.18821e−008 A8 = 4.84539e−011
A10 = −6.24432e−014 A12 = 4.33687e−015
Thirtieth surface
K = 0.00000e+000 A4 = −6.59258e−005 A6 = 7.46300e−007 A8 = −5.93573e−009
A10 = 2.94143e−011 A12 = −6.27604e−014
Thirty-first surface
K = 0.00000e+000 A4 = −2.90274e−005 A6 = 6.29498e−007 A8 = −3.79841e−009
A10 = 1.47494e−011 A12 = −2.52922e−014

Various Types Of Data
Zoom ratio 1.89

| | Wide angle | Middle | Telephoto |
|---|---|---|---|
| Focal length | 12.36 | 17.28 | 23.30 |
| F-number | 2.91 | 2.91 | 2.91 |
| Half angle of view (°) | 57.41 | 51.25 | 42.88 |
| Image height | 21.64 | 21.64 | 21.64 |
| Entire lens length | 130.51 | 122.33 | 119.64 |
| BF | 13.43 | 18.88 | 24.55 |
| d9 | 22.59 | 9.36 | 1.00 |
| d15 | 1.81 | 1.40 | 1.40 |
| d19 | 5.47 | 3.28 | 1.30 |
| d26 | 1.40 | 3.02 | 5.40 |
| d29 | 7.03 | 7.60 | 7.20 |
| d33 | 13.43 | 18.88 | 24.55 |

Zoom Lens Group Data

| Group | Start surface | Focal length |
|---|---|---|
| 1 | 1 | −16.25 |
| 2 | 10 | 32.38 |
| 3 | 16 | −67.90 |
| 4 | 20 | 23.86 |
| 5 | 27 | −43.80 |
| 6 | 30 | 2124.22 |

[Numerical Example 3]
(unit: mm)

Surface Data

| Surface number | r | d | nd | vd | Effective diameter |
|---|---|---|---|---|---|
| 1 | 53.599 | 1.40 | 1.77250 | 49.6 | 43.82 |
| 2 | 18.113 | 5.22 | | | 32.21 |
| 3* | 22.075 | 2.20 | 1.58313 | 59.4 | 31.65 |
| 4* | 10.628 | 10.87 | | | 26.46 |
| 5 | −44.745 | 1.00 | 1.49700 | 81.5 | 26.19 |
| 6 | 57.018 | 0.20 | | | 25.97 |
| 7 | 34.464 | 5.00 | 1.83400 | 37.2 | 26.18 |
| 8 | −232.206 | (variable) | | | 25.60 |
| 9 (Stop) | ∞ | 0.30 | | | 18.03 |
| 10 | 28.190 | 0.90 | 1.95375 | 32.3 | 18.71 |
| 11 | 16.928 | 4.39 | 1.63980 | 34.5 | 18.37 |
| 12 | 92.174 | 0.15 | | | 18.46 |
| 13 | 22.781 | 0.90 | 1.91082 | 35.3 | 18.81 |
| 14 | 13.865 | 7.08 | 1.51633 | 64.1 | 18.09 |
| 15 | −77.716 | 1.33 | | | 18.16 |
| 16 | −101.166 | 0.70 | 1.72047 | 34.7 | 18.03 |
| 17 | 22.540 | 2.37 | 2.00069 | 25.5 | 18.09 |
| 18 | 52.661 | (variable) | | | 17.96 |
| 19 | 27.758 | 0.90 | 1.80400 | 46.5 | 18.26 |
| 20 | 13.290 | 6.78 | 1.49700 | 81.5 | 17.64 |
| 21 | −85.129 | 0.20 | | | 17.86 |
| 22* | 31.208 | 6.99 | 1.49700 | 81.5 | 19.27 |
| 23* | −21.124 | (variable) | | | 20.01 |
| 24 | 97.737 | 0.75 | 1.80400 | 46.5 | 19.32 |
| 25 | 22.020 | (variable) | | | 18.89 |
| 26* | −83.892 | 1.60 | 1.85400 | 40.4 | 21.10 |
| 27* | 1997.530 | (variable) | | | 22.21 |
| 28 | −426.907 | 5.12 | 1.48749 | 70.2 | 38.12 |
| 29 | −49.575 | 14.99 | | | 38.85 |
| Image plane | ∞ | | | | |

Aspheric Surface Data

Third surface
K = 0.00000e+000 A4 = −4.03233e−005 A6 = 2.84310e−007 A8 = −1.85419e−009
A10 = 6.48125e−012 A12 = −1.22378e−014 A14 = 9.28892e−018

Fourth surface
K = −5.60601e−001 A4 = −6.16452e−005 A6 = 2.38219e−007 A8 = −1.71089e−009
A10 = −6.46493e−012 A12 = 6.50194e−014 A14 = −1.76965e−016

Twenty-second surface
K = 0.00000e+000 A4 = −1.67837e−005 A6 = −3.64843e−008 A8 = 1.07618e−009
A10 = −1.24350e−011 A12 = 7.09601e−014

Twenty-third surface
K = 0.00000e+000 A4 = 1.93177e−005 A6 = −1.27575e−007 A8 = 6.12378e−010
A10 = −8.15372e−012 A12 = 4.33482e−014

Twenty-sixth surface
K = 0.00000e+000 A4 = 2.55101e−005 A6 = −2.64846e−007 A8 = −4.54960e−010
A10 = 8.83199e−012 A12 = −3.33076e−014

Twenty-seventh surface
K = 0.00000e+000 A4 = 3.69079e−005 A6 = −2.56285e−007 A8 = 4.52183e−010
A10 = 1.47250e−012 A12 = −6.14678e−015

Various Types of Data
Zoom ratio 2.35

| | Wide angle | Middle | Telephoto |
|---|---|---|---|
| Focal length | 14.42 | 24.42 | 33.95 |
| F-number | 4.08 | 4.08 | 4.12 |
| Half angle of view (°) | 53.26 | 41.34 | 32.50 |
| Image height | 21.64 | 21.64 | 21.64 |
| Entire lens length | 125.87 | 118.34 | 125.87 |
| BF | 14.99 | 14.99 | 14.99 |
| d8 | 27.76 | 8.00 | 2.38 |
| d18 | 4.14 | 2.93 | 1.30 |
| d23 | 1.40 | 2.29 | 1.88 |
| d25 | 7.46 | 6.57 | 6.97 |
| d27 | 3.78 | 17.21 | 32.00 |

-continued

[Numerical Example 3]
(unit: mm)

Zoom Lens Group Data

| Group | Start surface | Focal length |
|---|---|---|
| 1 | 1 | −22.94 |
| 2 | 9 | 62.86 |
| 3 | 19 | 21.50 |
| 4 | 24 | −35.51 |
| 5 | 26 | −94.24 |
| 6 | 28 | 114.54 |

[Numerical Example 4]
(unit: mm)

Surface Data

| Surface number | r | d | nd | vd | Effective diameter |
|---|---|---|---|---|---|
| 1 | 69.215 | 1.70 | 1.76385 | 48.5 | 50.85 |
| 2 | 21.428 | 5.17 | | | 37.62 |
| 3* | 31.249 | 2.30 | 1.58313 | 59.4 | 37.18 |
| 4* | 15.909 | 12.89 | | | 32.33 |
| 5 | −42.876 | 1.00 | 1.43875 | 94.7 | 31.99 |
| 6 | 106.477 | 0.20 | | | 31.70 |
| 7 | 45.553 | 4.49 | 1.83400 | 37.2 | 31.79 |
| 8 | −634.660 | (variable) | | | 31.36 |
| 9 (Stop) | ∞ | (variable) | | | 23.60 |
| 10 | 52.261 | 2.46 | 1.72916 | 54.7 | 26.10 |
| 11 | 263.265 | 0.15 | | | 26.10 |
| 12 | 31.910 | 0.90 | 1.95375 | 32.3 | 26.30 |
| 13 | 17.077 | 8.89 | 1.58267 | 46.4 | 24.93 |
| 14 | −117.291 | (variable) | | | 24.86 |
| 15 | −91.733 | 0.70 | 1.72047 | 34.7 | 24.27 |
| 16 | 27.559 | 2.96 | 2.00069 | 25.5 | 24.34 |
| 17 | 64.329 | 2.00 | | | 24.19 |
| 18 | ∞ | (variable) | | | 24.31 |
| 19 | 32.406 | 0.90 | 1.83481 | 42.7 | 24.83 |
| 20 | 17.852 | 8.12 | 1.43875 | 94.7 | 23.93 |
| 21 | −123.183 | 0.20 | | | 24.22 |
| 22* | 33.004 | 9.54 | 1.49700 | 81.5 | 26.54 |
| 23* | −23.827 | (variable) | | | 27.20 |
| 24 | 4131.745 | 2.01 | 2.00069 | 25.5 | 25.45 |
| 25 | −88.248 | 0.75 | 1.72047 | 34.7 | 25.27 |
| 26 | 31.864 | (variable) | | | 24.27 |
| 27* | −166.689 | 1.60 | 1.85400 | 40.4 | 24.90 |
| 28* | 82.150 | (variable) | | | 25.59 |
| 29 | 595.501 | 5.92 | 1.49700 | 81.5 | 39.14 |
| 30 | −50.768 | 15.11 | | | 39.80 |
| Image plane | ∞ | | | | |

Aspheric Surface Data

Third surface
K = 0.00000e+000 A4 = 1.41959e−005 A6 = −7.81904e−008 A8 = 3.46364e−010
A10 = −1.01509e−012 A12 = 1.45953e−015 A14 = −7.30050e−019
Fourth surface
K = −6.36442e−001 A4 = 1.55368e−005 A6 = −1.12080e−007 A8 = 5.29838e−010
A10 = −1.99889e−012 A12 = 2.59583e−015 A14 = −2.64013e−019
Twenty-second surface
K = 0.00000e+000 A4 = −6.99798e−006 A6 = −1.13680e−008 A8 = 1.53877e−011
A10 = −1.10382e−013 A12 = −4.97644e−016
Twenty-third surface
K = 0.00000e+000 A4 = 2.44559e−005 A6 = −8.82874e−008 A8 = 1.95669e−010
A10 = −1.85265e−013 A12 = −1.18827e−015
Twenty-seventh surface
K = 0.00000e+000 A4 = 5.05507e−005 A6 = −7.34842e−007 A8 = 4.77038e−009
A10 = −1.90408e−011 A12 = 3.62227e−014
Twenty-eighth surface
K = 0.00000e+000 A4 = 5.77402e−005 A6 = −6.55664e−007 A8 = 4.27445e−009
A10 = −1.57305e−011 A12 = 2.69924e−014

-continued

[Numerical Example 4]
(unit: mm)

Various Types of Data
Zoom ratio 2.20

|  | Wide angle | Middle | Telephoto |
|---|---|---|---|
| Focal length | 15.45 | 25.03 | 33.95 |
| F-number | 2.91 | 2.91 | 2.91 |
| Half angle of view (°) | 51.37 | 40.70 | 32.51 |
| Image height | 21.64 | 21.64 | 21.64 |
| Entire lens length | 149.62 | 134.58 | 135.96 |
| BF | 15.11 | 15.11 | 15.11 |
| d8 | 38.59 | 12.29 | 2.42 |
| d9 | 0.50 | 3.59 | 4.63 |
| d14 | 1.64 | 3.26 | 3.73 |
| d18 | 8.30 | 3.20 | 1.30 |
| d23 | 1.40 | 1.44 | 2.33 |
| d26 | 6.53 | 8.68 | 6.05 |
| d28 | 2.71 | 12.16 | 25.54 |

Zoom Lens Group Data

| Group | Start surface | Focal length |
|---|---|---|
| 1 | 1 | −28.99 |
| 2 | 10 | 41.93 |
| 3 | 15 | −75.73 |
| 4 | 19 | 25.63 |
| 5 | 24 | −52.21 |
| 6 | 27 | −64.25 |
| 7 | 29 | 94.41 |

The following table illustrates various values in Examples 1 to 4.

TABLE 1

|  | Inequality | Example 1 | Example 2 | Example 3 | Example 4 |
|---|---|---|---|---|---|
| (1) | $-4.0 < fLN/ft < -1.0$ | −1.72 | −2.91 | −2.17 | −2.23 |
| (2) | $0.8 < fLP/ft < 1.8$ | 1.50 | 1.39 | 1.13 | 1.24 |
| (3) | $-2.4 < fLN/fLP < -0.8$ | −1.14 | −2.10 | −1.91 | −1.81 |
| (4) | $30 < vLN < 60$ | 42.22 | 34.71 | 34.71 | 34.71 |
| (5) | $-1.0 < (r1 + r2)/(r1 - r2) < 1.0$ | −0.09 | −0.58 | 0.32 | 0.18 |
| (6) | $0.00 < dLN/dt < 0.25$ | 0.06 | 0.10 | 0.12 | 0.12 |
| (7) | $-2.2 < f1/fw < -1.0$ | −1.73 | −1.31 | −1.59 | −1.88 |
| (8) | $-2.2 < f1/skw < -0.9$ | −1.44 | −1.21 | −1.53 | −1.92 |

[Imaging Apparatus]

Figure 13:
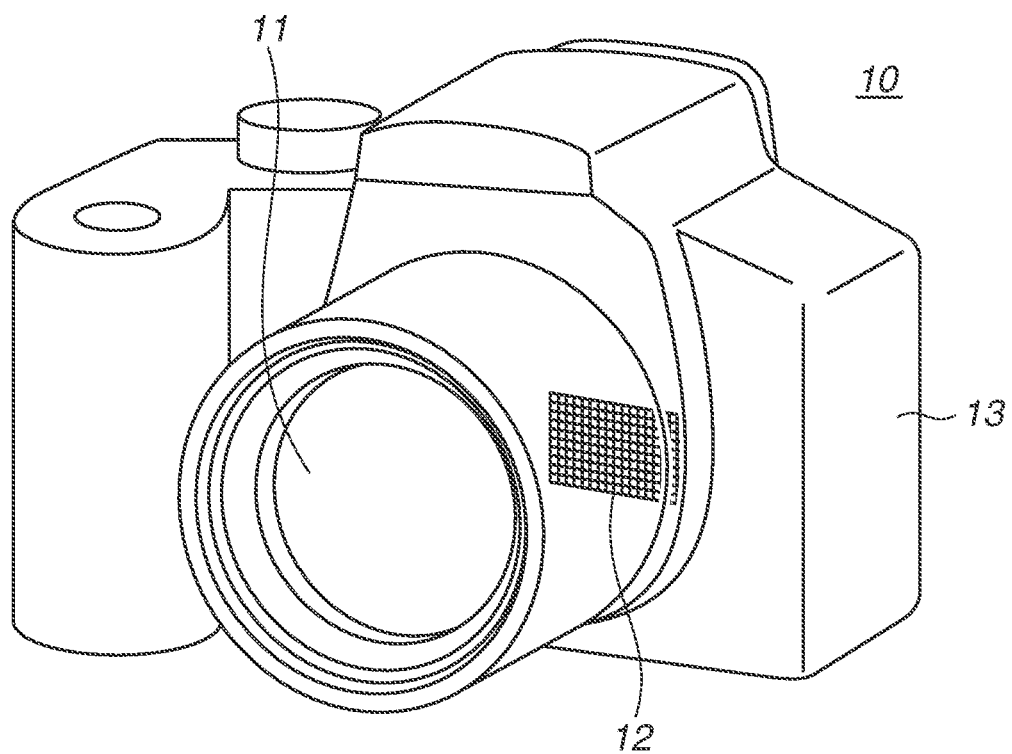
FIG. 13 is a schematic diagram of an imaging apparatus.

Next, an exemplary embodiment of the imaging apparatus according to the disclosure is described. FIG. 13 is a schematic diagram of an imaging apparatus (digital still camera) 10 according to the present exemplary embodiment. The imaging apparatus 10 according to the present exemplary embodiment includes a camera main body 13, a zoom lens 11 that is similar to that in any of Examples 1 to 4, and a light-receiving element (image sensor) 12 that photoelectrically converts an image formed by the zoom lens 11.

The imaging apparatus 10 according to the present exemplary embodiment can obtain a high quality image formed by the zoom lens 11 that has a wide angle of view and a downsized body and also keeps high optical performance even in image stabilization.

As the light-receiving element 12, an image sensor, such as a CCD sensor or a CMOS sensor can be used. In such a case, various types of aberration, such as distortion and chromatic aberration of an image acquired by the light-receiving element 12, are electrically corrected, whereby the image quality of an output image can be heightened.

The zoom lens L0 in each example can be applied not only to the digital still camera illustrated in FIG. 13, but also to various optical devices, such as a silver halide film camera, a video camera, an in-vehicle camera, and a surveillance camera. The camera may be a lens integrated camera or an interchangeable lens camera.

While exemplary embodiments and examples of the disclosure have been described above, the disclosure is not limited to these exemplary embodiments and examples, and these exemplary embodiments and examples can be combined, modified, and changed in various ways within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-199535, filed Dec. 1, 2020, which is hereby incorporated by reference herein in its entirety.

What is claimed is:

1. A zoom lens comprising:
a first lens unit and a rear group disposed in order from an object side to an image side, wherein the first lens unit has a negative refractive power and the rear group includes four or more lens units and has a positive refractive power as a whole,
wherein a distance between adjacent lens units changes in zooming,
wherein a lens unit arranged on a most object side in the rear group includes a lens subunit LP having a positive refractive power,
wherein the lens subunit LP consists of one or two positive lenses and one or two negative lenses,
wherein the rear group includes a lens subunit LN arranged adjacent to the lens subunit LP on the image side and having a negative refractive power,
wherein when image blur is corrected, the lens subunit LN moves in a direction including a component of a direction perpendicular to an optical axis,
wherein a focus unit is disposed closer to the image side than the lens units including the lens subunit LN in the rear group, and the focus unit is moved in focusing,
wherein the first lens unit includes two or more negative meniscus lenses each having a convex surface directed to the object side,
wherein the zoom lens includes an aperture stop disposed on the object side of the lens subunit LP or within the lens subunit LP, and
wherein a lens surface of the lens subunit LN closest to the object side is a concave surface directed to the object side, and a lens surface of the lens subunit LN closest to the image side is a concave surface directed to the image side,
wherein the following inequality is satisfied:

$$-2.3 < fLN/fLP \le -1.81,$$

where fLN is a focal length of the lens subunit LN, and fLP is a focal length of the lens subunit LP.

2. The zoom lens according to claim 1, wherein the following inequality is satisfied:

$$-4.0 < fLN/ft < -1.0$$

where fLN is a focal length of the lens subunit LN, and ft is a focal length of the zoom lens at a telephoto end.

3. The zoom lens according to claim 1, wherein the following inequality is satisfied:

$$0.8 < fLP/ft < 1.8$$

where fLP is a focal length of the lens subunit LP, and ft is a focal length of the zoom lens at a telephoto end.

4. The zoom lens according to claim 1, wherein the following inequality is satisfied;

$$30 < vLN < 42.22$$

where vLN is an Abbe number of a negative lens included in the lens subunit LN.

5. The zoom lens according to claim 1, wherein the following inequality is satisfied:

$$-1.0 < (r1 + r2)/(r1 - r2) < 1.0$$

where r1 is a radius of curvature of the lens surface closest to the object side among the lens surfaces of the lens subunit LN, and r2 is a radius of curvature of the lens surface closest to the image side among the lens surfaces of the lens subunit LN.

6. The zoom lens according to claim 1, wherein the following inequality is satisfied:

$$0.10 < dLN/dt < 0.25$$

where dLN is a distance on the optical axis from a lens surface closest to the object side among lens surfaces of the rear group to the lens surface closest to the object side among the lens surfaces of the lens subunit LN at a telephoto end, and dt is an entire lens length of the zoom lens at the telephoto end.

7. The zoom lens according to claim 1, wherein the following inequality is satisfied:

$$-2.2 < f1/fw < -1.0$$

where f1 is a focal length of the first lens unit, and fw is a focal length of the zoom lens at a wide angle end.

8. The zoom lens according to claim 1, wherein the following inequality is satisfied:

$$-2.2 < f1/skw < -0.9$$

where f1 is a focal length of the first lens unit, and skw is a back focus of the zoom lens at a wide angle end.

9. The zoom lens according to claim 1, wherein the lens subunit LN includes a positive lens and a negative lens.

10. The zoom lens according to claim 1, wherein at a wide angle end, a distance between the first lens unit and the rear group is the longest distances among distances between the lens units included in the zoom lens.

11. The zoom lens according to claim 1, wherein the following inequality is satisfied:

$$-4.0 < fLN/ft \le -1.72$$

where fLN is a focal length of the lens subunit LN, and ft is a focal length of the zoom lens at a telephoto end.

12. The zoom lens according to claim 1, wherein the following inequality is satisfied:

$$1.13 \le fLP/ft < 1.8$$

where fLP is a focal length of the lens subunit LP, and ft is a focal length of the zoom lens at a telephoto end.

13. The zoom lens according to claim 1, wherein the lens subunit LP is arranged on the most object side in the lens unit arranged on the most object side in the rear group.

14. The zoom lens according to claim 1,
wherein the rear group includes a second lens unit that is the lens unit arranged on a most object side in the rear group, a third lens unit, a fourth lens unit, and a fifth lens unit disposed in order from the object side to the image side, and
wherein when a lens obtained by cementing a negative lens with a convex surface directed to the object side and a positive lens disposed in order from the object side to the image side is a cemented lens NP, a total number of cemented lenses NP included in the second lens unit, the third lens unit, and the fourth lens unit is two or more.

15. The zoom lens according to claim 1, wherein the focus unit includes a negative meniscus leans with a convex surface directed to the object side.

16. The zoom lens according to claim 1, wherein the focus unit includes one cemented lens obtained by cementing a positive lens and a negative lens.

17. The zoom lens according to claim 1, further comprising two or more single lenses having a positive refractive power disposed closer to the image side than the lens subunit LN.

18. The zoom lens according to claim 1, wherein the focus unit consists of two or less lenses.

19. The zoom lens according to claim 18, wherein the focus unit has a negative refractive power as a whole, has a convex lens surface, closest to the object side among lens surfaces of the focus unit, facing the object side, and has a concave lens surface, closest to the image side among the lens surfaces of the focus unit, facing the image side.

20. The zoom lens according to claim 1, wherein the focus unit has a negative refractive power and consist of a cemented lens or a single lens.

21. The zoom lens according to claim 1, wherein the lens subunit LP includes a meniscus lens having a positive refractive power with a convex surface facing the object side.

22. The zoom lens according to claim 1, wherein the lens unit arranged on a most object side in the rear group includes three or more cemented lenses consisting of two lenses.

23. An imaging apparatus comprising:
a zoom lens, and
an image sensor configured to receive light of an image formed by the lens,
wherein the zoom lens includes a first lens unit and a rear group disposed in order from an object side to an image side, wherein the first lens unit has a negative refractive power and the rear group includes four or more lens units and has a positive refractive power as a whole,
wherein a distance between adjacent lens units changes in zooming,
wherein a lens unit arranged on a most object side in the rear group includes a lens subunit LP having a positive refractive power,
wherein the lens subunit LP consists of one or two positive lenses and one or two negative lenses,
wherein the rear group includes a lens subunit LN arranged adjacent to the lens subunit LP on the image side and having a negative refractive power,
wherein when image blur is corrected, the lens subunit LN moves in a direction including a component of a direction perpendicular to an optical axis,
wherein a focus unit is disposed closer to the image side than the lens units including the lens subunit LN in the rear group, and the focus unit is moved in focusing,
wherein the first lens unit includes two or more negative meniscus lenses each having a convex surface directed to the object side,
wherein the zoom lens includes an aperture stop disposed on the object side of the lens subunit LP or within the lens subunit LP, and
wherein a lens surface closest to the object side among lens surfaces of the lens subunit LN and a lens surface closest to the image side among the lens the surfaces of the lens subunit LN are both concave surfaces,
wherein the following inequality is satisfied:

$$-2.3 < fLN/fLP \leq -1.81,$$

where fLN is a focal length of the lens subunit LN, and fLP is a focal length of the lens subunit LP.

24. The imaging apparatus according to claim 23, wherein in the lens, the following inequality is satisfied:

$$-4.0 < fLN/ft < -1.0$$

where fLN is a focal length of the lens subunit LN, and ft is a focal length of the zoom lens at a telephoto end.

25. The imaging apparatus according to claim 23, wherein in the lens, the following inequality is satisfied:

$$0.8 < fLP/ft < 1.8$$

where fLP is a focal length of the lens subunit LP, and ft is a focal length of the zoom lens at a telephoto end.

26. The imaging apparatus according to claim 23, wherein in the lens, the following inequality is satisfied:

$$30 < vLN < 42.22$$

where vLN is an Abbe number of a negative lens included in the lens subunit LN.

27. The imaging apparatus according to claim 23, wherein in the lens, the following inequality is satisfied:

$$-1.0 < (r1 + r2)/(r1 - r2) < 1.0$$

where r1 is a radius of curvature of the lens surface closest to the object side among the lens surfaces of the lens subunit LN, and r2 is a radius of curvature of the lens surface closest to the image side among the lens surfaces of the lens subunit LN.

28. The imaging apparatus according to claim 23, wherein in the lens, the following inequality is satisfied:

$$0.10 < dLN/dt < 0.25$$

where dLN is a distance on the optical axis from a lens surface closest to the object side among lens surfaces of the rear group to the lens surface closest to the object side among the lens surfaces of the lens subunit LN at a telephoto end, and dt is an entire lens length of the zoom lens at the telephoto end.

29. The imaging apparatus according to claim 23, wherein in the lens, the following inequality is satisfied:

$$-2.2 < f1/fw < -1.0$$

where f1 is a focal length of the first lens unit, and fw is a focal length of the zoom lens at a wide angle end.

* * * * *